(12) United States Patent
Kasahara et al.

(10) Patent No.: US 6,979,026 B2
(45) Date of Patent: Dec. 27, 2005

(54) CONNECTOR CLIP FOR VERIFYING COMPLETE CONNECTION BETWEEN A CONNECTOR AND A PIPE AND CONNECTOR CONNECTING STRUCTURE THEREFOR

(75) Inventors: Kazuhito Kasahara, Aichi-ken (JP); Tomoki Inoue, Aichi-ken (JP)

(73) Assignee: Tokai Rubber Industries, Ltd., (JP)

( * ) Notice: Subject to any disclaimer, the term of this patent is extended or adjusted under 35 U.S.C. 154(b) by 0 days.

(21) Appl. No.: 10/768,500

(22) Filed: Jan. 30, 2004

(65) Prior Publication Data
US 2004/0183295 A1 Sep. 23, 2004

(30) Foreign Application Priority Data
Jan. 13, 2003 (JP) .............................. 2003-025327
Jan. 13, 2003 (JP) .............................. 2003-025328

(51) Int. Cl.[7] .............................................. F16L 37/12
(52) U.S. Cl. ........................... 285/93; 285/319; 285/81
(58) Field of Search .............................. 285/319, 93, 81

(56) References Cited

U.S. PATENT DOCUMENTS

| | | | | |
|---|---|---|---|---|
| 3,929,357 A | * | 12/1975 | DeVincent et al. | ......... 285/319 |
| 4,035,005 A | * | 7/1977 | DeVincent et al. | ......... 285/319 |
| 4,135,745 A | * | 1/1979 | Dehar | ......... 285/319 |
| 4,979,765 A | * | 12/1990 | Bartholomew | ......... 285/93 |
| 5,354,102 A | * | 10/1994 | Carman | ......... 285/81 |
| 5,395,140 A | * | 3/1995 | Wiethorn | ......... 285/93 |
| 5,779,279 A | * | 7/1998 | Bartholomew | ......... 285/93 |
| 5,931,509 A | * | 8/1999 | Bartholomew | ......... 285/93 |
| 6,601,878 B2 | * | 8/2003 | Ooi et al. | ......... 285/93 |
| 6,762,365 B2 | * | 7/2004 | Inoue et al. | ......... 174/84 R |
| 2003/0094809 A1 | * | 5/2003 | Inoue | ......... 285/93 |
| 2004/0066034 A1 | * | 4/2004 | Takayanagi et al. | ......... 285/93 |
| 2004/0183296 A1 | * | 9/2004 | Inoue et al. | ......... 285/93 |

OTHER PUBLICATIONS

Patent Abstract of Japan Publication No. 11-006591; Pipe Connector Device.

* cited by examiner

Primary Examiner—Eric K. Nicholson
(74) Attorney, Agent, or Firm—Andrus, Sceales, Starke & Sawall, LLP

(57) ABSTRACT

The connector clip for verifying complete connection includes a connection verifying portion, more specifically, a pair of restraining portions having an assistance structure to certainly detect incomplete connection between the connector and the pipe. The assistance structure may be constructed so as to remove a sealing property between the connector and the pipe in incomplete connection relation with one another.

12 Claims, 24 Drawing Sheets

CONNECTOR CLIP FOR VERIFYING COMPLETE CONNECTION BETWEEN A CONNECTOR AND A PIPE AND CONNECTOR CONNECTING STRUCTURE THEREFOR

BACKGROUND OF THE INVENTION

The present invention relates to a connector clip which is adapted to verify complete connection or fitting connection between a connector used in a joint of a piping, for example, a gasoline fuel piping of a vehicle, and a pipe inserted in the connector, and a connector connecting structure including such connector clip.

In a joint of a fluid piping, a connector having a tube connecting portion is applied to join a pipe and a tube. In such piping, for example, the pipe is provided with an annular engagement projection on an outer peripheral surface of one axial side or an inserting end portion, and the connector is configured with a retainer fitted in a pipe inserting portion, or a holding portion of a connector housing. Then, the pipe is inserted into the retainer so as to allow the annular engagement projection to snap-engage with one axial end portion of the retainer providing a stop mechanism between the pipe and the connector with a tube connected to the tube connecting portion. Hence, if an operator does not take care sufficiently to complete connection between the pipe and the connector, the pipe might not be fully inserted into the retainer and the annular engagement projection of the pipe might not snap-engage with one axial end portion of the retainer, or the retainer might not be fitted properly in the holding portion of the connector housing. That is, the pipe might be in a half-fitting relation with respect to the connector. Meanwhile within a connecting portion between a connector and a pipe, a sealing member is disposed to prevent an internal fluid from leaking out. However, in case of a piping system subject to operation while the pipe is incompletely connected with the connector, usually sealing property by the sealing member between the connector and the pipe is insufficient or becomes lowered, and an internal fluid leaks out. In view of the foregoing aspect, it is preferred to adapt a connector connecting structure for verifying complete connection and preventing incomplete connection between a connector and a pipe, in order not to subject a piping system to operation while the pipe is not fully inserted into the retainer, or the retainer is not properly fitted in the connector.

As for such connector connecting structure for verifying complete connection between a connector and a pipe, a connector connecting structure disclosed in the following Patent Document 1 is known. In the connector connecting structure, in addition to an annular engagement projection (first annular rib) for snap-engagement, an annular verification projection (second annular rib) is provided on an outer peripheral surface of the pipe so as to be located on an opposite axial side of or beyond an opposite axial end of the connector when the pipe is connected to the connector. And, a connector clip for verifying complete connection between a connector and a pipe is put and mounted on the connector and the pipe. The connector clip includes a clip body (intermediate part) of U-shape in cross section having one-side wall portion (second lateral wall) and an opposite-side wall portion (first lateral wall) on opposite ends thereof. The opposite-side wall portion (first lateral wall) is provided with a connection verifying portion (protruding portion). One-side wall portion of the connector clip for verifying complete connection is provided with a connector fit-on recess (second cutaway recess) and the opposite-side wall portion is also formed with a pipe fit-on recess (first cutaway recess). The connector fit-on recess (second cutaway recess) is to be fitted on a portion of the connector on one axial side of a holding portion, and adjacent to the holding portion, while the pipe fit-on recess (first cutaway recess) is to be fitted on a portion of the pipe on an opposite axial side of the annular verification projection, and adjacent to the annular verification projection. And, the connection verifying portion is configured by a pair of restraining portions formed on opposite end portions or both widthwise sides of the pipe fit-on recess of the opposite-side wall portion. A distance between a pair of the restraining portions is designed equal to a width of an opening side (a side of a first guiding surface of the first cutaway recess) of the pipe fit-on recess.

If the pipe is correctly inserted and connected to the connector and the annular verification projection is located in a fixed axial position, the connector clip for verifying complete connection is easily mounted on the connector and the pipe so as to clip a held portion from the holding portion of the connector to the annular verification projection of the pipe by the one and the opposite-side wall portions from axially opposite sides thereof. However, if the pipe is incompletely fitted in the connector and the annular verification projection is located relatively (relatively with respect to the connector) toward an opposite axial direction of or beyond the fixed axial position, the annular verification projection abuts the connection verifying portion, is not allowed to pass through the connection verifying portion, and therefore, the connector clip cannot be mounted on the connector and the pipe. For this reason, complete connection of the pipe to the connector can be verified by mounting the connector clip on the connector and the pipe. On the contrary, when the connector clip cannot be mounted to the connector and the pipe, incomplete connection of the pipe can be consequently verified.

Patent Document 1 JP, A, 11-6591

Meanwhile, in a connector connecting structure disclosed in the Patent Document 1, an axial distance between an inner or inside surface of the opposite-side wall portion and an opposite axial end of the connection verifying portion is designed longer than an axial length between the annular engagement projection and the annular verification projection. Accordingly, even if the pipe is incompletely fitted in the connector and the annular verification projection is to be located on an opposite axial side of or beyond the connection verifying portion, the annular engagement projection abuts the connection verifying portion and the connector clip for verifying complete connection cannot be mounted on the connector and the pipe. Therefore, this configuration also enables to verify incomplete connection of a pipe even under such circumstances.

However, if a pipe is formed with a bent portion on an opposite axial side of or beyond the annular verification projection and in proximity thereof, in some cases, the connection verifying portion should be designed short in order not to cause interference between an opposite axial end portion of the connection verifying portion and the bent portion when the connector clip is mounted to the connector and the pipe in complete connecting relation. And, recently, as components and parts are closely arranged in a vehicle, the connection verifying portion is preferably designed as short as possible in order not to cause interference between the connector verifying portion and other components and parts when mounting the connector clip. But, in the connection verifying portion designed short, if the annular verification projection is located on an opposite axial side of or beyond the connection verifying portion, the connector clip can be mounted to the connector and the pipe although the pipe is incompletely connected to the connector, and thereby connection verifying function of the connector connecting structure is lowered.

And, in the connector clip for verifying complete connection between a connector and a pipe disclosed in the Patent Document 1, each of restraining portions is formed in a thin-walled restraining lug. So, a reinforcement rib is formed integrally between the restraining portion and the opposite-side wall portion to prevent the restraining portion from being so deformed as to allow the annular verification projection to pass through when the annular verification projection is pressed.

However, the reinforcement ribs are provided on widthwise outer end portions of restraining portions, i.e., restraining lugs respectively, and a space wider than the annular verification projection is defined between the reinforcement ribs. Therefore, even when a pipe is relatively incompletely fitted in a connector, as shown in FIG. 24, for example, if a portion of a pipe between an opposite axial end of a connector A and an annular verification projection B is passed through between a pair of the restraining lugs C via an opposite axial side thereof, whole of the annular verification projection B can be located between an opposite-side wall portion D and the restraining lug C of a connector clip E for verifying complete connection. In this occasion, by inclining or rotating the connector clip D about a side of the restraining lugs C (refer to an arrow in FIG. 24), the connector clip E can be mounted to the connector A and the pipe F while a holding portion G of the connector A is received in a clip body H as shown in FIG. 25. Also from this point of view, thus configured connector connecting structure or connector clip for verifying complete connection cannot be expected a positive function for verifying complete connection between a connector and a pipe.

Accordingly, it is an object of the present invention to provide a connector clip and a connector connecting structure using the connector clip having an excellent function for verifying complete connection between a connector and a pipe.

SUMMARY OF THE INVENTION

In order to achieve the aforementioned object, there is provided a novel connector clip for verifying complete connection between a connector and a pipe, namely, connector clip for preventing incomplete connection between a connector and a pipe. The connector clip, for example, the connector cap for verifying complete connection between a connector and a pipe according to the present invention is applied to be put on and mounted to a connector and a pipe inserted in the connector. The connector has a tube connecting portion on one axial side thereof and retainer means on an opposite axial side thereof, and is provided with a sealing member in an inner peripheral surface thereof. The pipe is provided with an annular engagement projection and an annular verification projection on an outer peripheral surface thereof. The pipe is inserted into an opening on an axial end of the connector so as to allow an inserting end (an insertion end) thereof to be located beyond the sealing member, and the annular engagement projection to be snap-engaged with the retainer means. The annular verification projection is located in or near an opposite axial end of the connector or on an opposite axial side of an opposite axial end of the connector when the pipe is inserted in and connected to the connector. Here, a "tube connecting portion" means or indicates connecting portions for a wide variety of mating members to be joined with a pipe. The connector clip for verifying complete connection between a connector and a pipe according to the present invention comprises a clip body on one axial side thereof and a connection verifying portion on an opposite axial side thereof, continued from the clip body. The clip body includes one clip portion and an opposite clip portion on one and opposite axial end portions or positions thereof respectively, and is configured to receive a held portion from a large diameter portion on an opposite axial side of the connector to the annular verification projection of the pipe so as to be held by the clip portions from axially opposite ends of the held portion. According to the present invention, the connection verifying portion is configured by a pair of restraining portions extending from the clip body in an opposite axial direction with a widthwise distance so as to allow a body of the pipe to pass through or move therebetween but not to allow the annular engagement projection and the annular verification projection of the pipe to pass through therebetween. And, a pair of the restraining portions have or are provided with an assistance structure to effectively detect (verify) incomplete connection between the connector and the pipe. Here, terms "axial" and "axial direction" means a direction of an axis of a connector, a connector housing, a pipe or any relevant member.

The clip body receives a held portion from the large diameter portion (for example, one axial end thereof) of the connector to the annular verification projection of the pipe. In some cases, a radially outwardly projecting portion formed on an outer peripheral surface of the connector falls under a "large diameter portion" of the connector. The clip portions of the clip body on one and opposite axial end portions or positions (proximities of one axial end or an opposite axial end fall under the one axial end position or the opposite axial end position) receives a held portion from the large diameter portion to the annular verification projection of the pipe not axially spaced or slightly axially spaced. That is, an axial distance between a pair of the clip portions is designed equal to or generally equal to an axial length of the held portion from the large diameter portion (for example, one axial end thereof) to the annular verification projection (for example, an opposite axial end thereof) when the pipe is correctly inserted and connected to the connector. Therefore, if the pipe is incompletely connected to the connector and the annular verification projection of the pipe is located toward an opposite axial side, the annular verification projection is located on a side of the connection verifying portion of the connector clip when the connector clip is tried to be mounted. However, a pair of the restraining portions of the connection verifying portion is configured with a widthwise distance, for example, generally equal to an outer diameter of a body (a portion of the pipe excluding the annular engagement projection and the annular verification projection) of the pipe, so as not to allow the annular verification projection to pass through or move therebetween. As a result, the annular verification projection of the pipe and the connection verifying portion interfere with one another, and the connector clip for verifying complete connection between a connector and a pipe cannot be mounted to the connector and the pipe. That is, when the connector clip is successfully mounted to the connector and the pipe, the pipe is relatively completely inserted and connected to the connector.

Further, according to the present invention, a pair of the restraining portions have or are provided with assistance structure to effectively detect (verify) incomplete connection between a connector and a pipe. Then there is less fear that incomplete connection therebetween is undetected or overlooked.

An axial distance between the opposite clip portion and an opposite axial end of the connection verifying portion may be designed shorter than an axial length between the annular engagement projection and the annular verification projection of the pipe. Here, the assistance structure is constructed by designing an axial distance between the opposite clip portion and an opposite axial end of the connection verifying portion equal to or longer than an axial distance between the inserting end of the pipe and an opposite axial end of the sealing member. In such construction, if the pipe is incompletely connected to the connector, the annular verification projection of the pipe is located toward an opposite axial side, and on an opposite axial side of the connection verifying portion of the connector clip (on an opposite axial side from or beyond the connection verifying portion of the connector clip), a portion of the pipe between the annular engagement projection and the annular verification projection is allowed to pass through or move between a pair of the restraining portions. And, consequently, it might happen that the connector clip is mounted to the connector and the pipe. However, an axial distance from the clip portion disposed on an opposite axial end portion or position of the clip body to an opposite axial end of the connection verifying portion (restraining portion) is designed equal to or longer than an axial distance between the inserting end of the pipe and an opposite axial end of the sealing member. So, in this case, the inserting end of the pipe is retracted to a position on an opposite axial side of an opposite axial end of the sealing member (a position on an opposite axial side from or beyond an opposite axial end of the sealing member). Accordingly, at inspection to verify connection between a connector and a pipe by flowing inspection fluid in the connector and the pipe, the inspection fluid leaks out between the connector and the pipe, and thereby it is verified that the pipe is incompletely connected to the connector.

The clip body may be configured to have an inner receiving portion of U-shape in cross-section, while the connection verifying portion may be configured to include a joint portion to join a pair of the restraining portions and have a receiving recess of U-shape in cross section to receive an opposite axial side of the annular verification projection with respect to the pipe (an opposite axial side from or beyond the annular verification projection with respect to the pipe).

Also, a connector connecting structure for verifying complete connection between a connector and a pipe according to the present invention is constructed by way of putting a connector clip thereon and mounting it thereto. The connector has a tube connecting portion on one axial side thereof and retainer means on an opposite axial side thereof, and is provided with sealing member in an inner peripheral surface thereof The pipe is provided with an annular engagement projection and an annular verification projection on an outer peripheral surface thereof The pipe is inserted into an opening on an axial end of the connector so as to allow an inserting end thereof to be located beyond the sealing member, and the annular engagement projection to be snap-engaged with the retainer means. The annular verification projection is located in or near an opposite axial end of the connector or on an opposite axial side of an opposite axial end of the connector. The connector clip for verifying complete connection between a connector and a pipe comprises a clip body on one axial side thereof and a connection verifying portion on an opposite axial side thereof, contin-ued from the clip body. The clip body includes one clip portion and an opposite clip portion on one and opposite axial end portions or positions thereof respectively. The clip body receives therein a held portion from a large diameter portion on an opposite axial side of the connector to the annular verification projection of the pipe so as to be held by the clip portions from axially opposite ends of the held portion. The connection verifying portion is configured by a pair of restraining portions extending from the clip body in an opposite axial direction with a widthwise distance so as to allow a body of the pipe to pass through or move therebetween but not to allow the annular engagement projection and the annular verification projection of the pipe to pass through therebetween, An axial distance between the opposite clip portion of the clip body and an opposite axial end of the connection verifying portion is designed shorter than an axial length between the annular engagement projection and the annular verification projection of the pipe and equal to or longer than an axial distance between the inserting end of the pipe and an opposite axial end of the sealing member.

According to the present invention, the one clip portion of the clip body may be defined in an inside (inner) surface of one-side wall portion (for example, an inside (inner) surface of the one-side wall portion is configured as the one clip portion) having a connector fit-on recess of U-shape. And, the opposite clip portion of the clip body may be defined in an inside (inner) surface of an opposite-side wall portion (for example, an inside (inner) surface of the opposite-side wall portion is configured as the opposite clip portion) having a pipe fit-on recess of U-shape with a width equal to or generally equal to an outer diameter of a body of the pipe. The one-side wall portion may be formed on one axial end portion of the clip body, and the opposite-side wall portion may be formed on an opposite axial end portion of the clip body. A pair of the restraining portions may be formed in a form of a pair of restraining lugs which are formed integrally on end portions of an opening side of the opposite-side wall portion with pipe fit-on recess therebetween and extend in an opposite axial direction And, reinforcement ribs may be provided integrally between the restraining lugs and the opposite-side wall portion respectively. An axial distance between the opposite clip portion and opposite axial end of the restraining lug may be designed longer than an axial length between the annular engagement projection and the annular verification projection of the pipe. Here, the assistance structure may be constructed by designing a distance between a pair of the reinforcement ribs shorter than an outer diameter of the annular verification projection of the pipe. A portion of the pipe between the annular engagement projection and the annular verification projection, in parallel relation to a pair of the restraining lugs, cannot pass through therebetween. In this construction, additionally, when the pipe is incompletely connected to the connector and the annular verification projection is in a positional relation to abut a pair of the restraining lugs, even if one axial side of (from or beyond) the annular verification projection (a portion of the pipe between the annular engagement projection and the annular verification projection) with respect to the pipe is let through or fitted between a pair of the restraining lugs via an opposite axial side of the restraining lugs, the annular verification projection is prevented from entirely entering between the restraining lugs and the opposite-side wall portion (for example, in space on one axial side of an opposite axial end of the restraining lugs) due to abutment and interference with the reinforcement ribs. Hence, an end of an opening side of the opposite-side wall portion or one axial end portions of the restraining lugs abut the annular engagement projection, the connector clip cannot be handled to be mounted so as to allow the pipe to pass through between a pair of the restraining lugs. Therefore, as long as the pipe is incompletely connected to the connector, the connector clip certainly or near certainly cannot be mounted to the connector and the pipe.

In order to further ensure to prevent the annular verification projection from entirely entering between the restraining lugs and the opposite-side wall portion, reinforcement ribs are preferably formed for entire length of the reinforcement lugs respectively. And, the reinforcement ribs may be formed along the pipe fit-on recess respectively, and a distance between a pair of the reinforcement ribs may be designed equal to or generally equal to a width of the pipe fit-on recess.

Furthermore, if the one-side wall portion provided in the clip body is raised in one axial direction so that the connector fit-on recess protrudes in one axial direction, a width or length from an outer edge of the one-side wall portion to the connector fit-on recess may be designed large, and thereby a peripheral rim of the connector fit-on recess easily opens due to deformation of the one-side wall portion. So, even if the annular verification projection is formed somewhat thick or slightly toward an opposite axial direction, it becomes possible to receive a held portion from the large diameter portion of the connector to the annular verification projection between the one-side wall portion and the opposite-side wall portion.

As described above, the connector clip for verifying complete connection between a connector and a pipe and the connector connecting structure provided with the connector clip according to the present invention respectively, has an excellent function to prevent incomplete connection between a connector and a pipe.

Now, the preferred embodiments of the present invention will be described in detail with reference to the drawings.

DETAILED DESCRIPTIONS OF PREFERRED EMBODIMENTS

Figure 1:
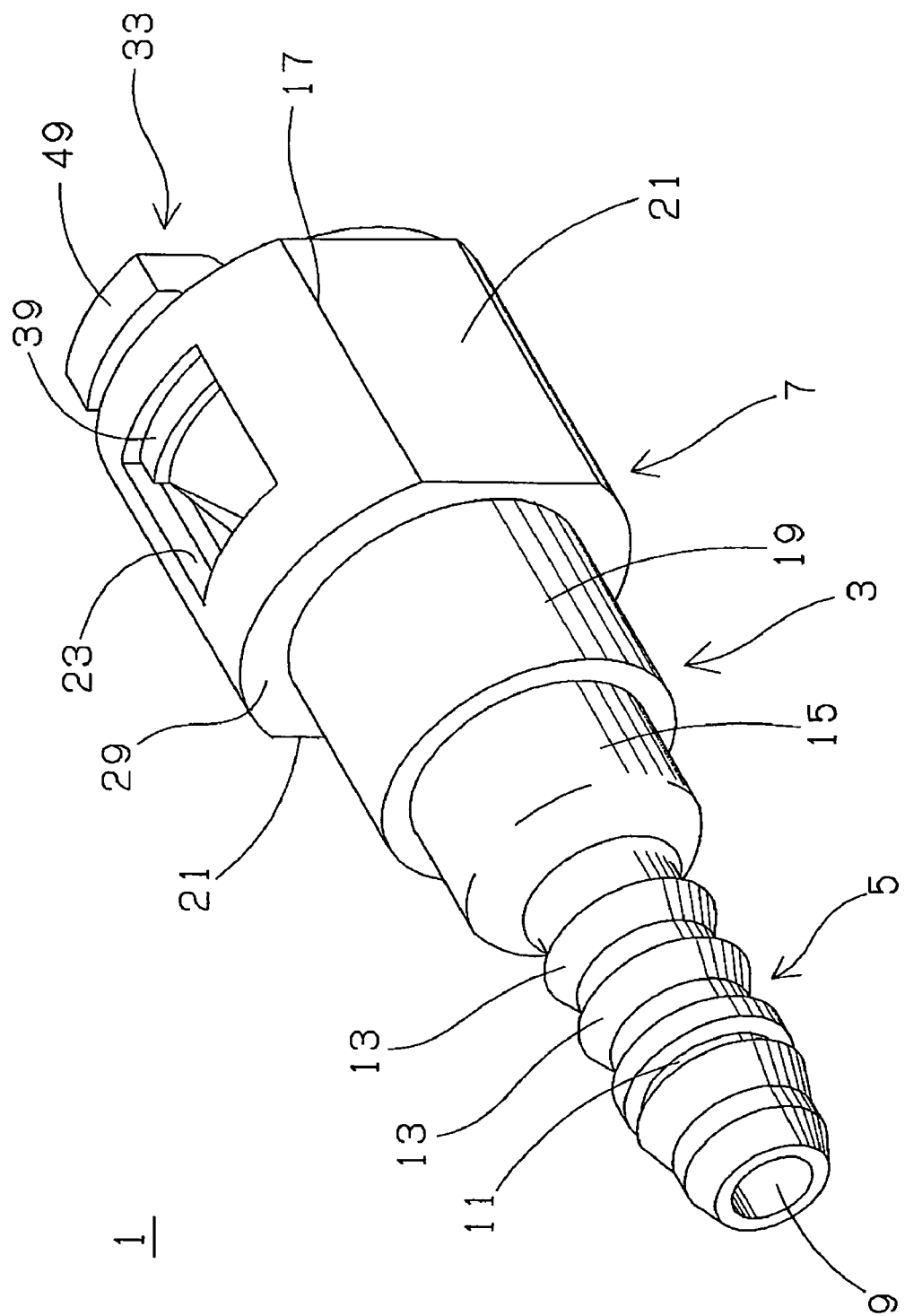
FIG. 1 is a perspective view of a connector to which a connector clip for verifying complete connection between a connector and a pipe according to the present invention is applied.
Figure 2:
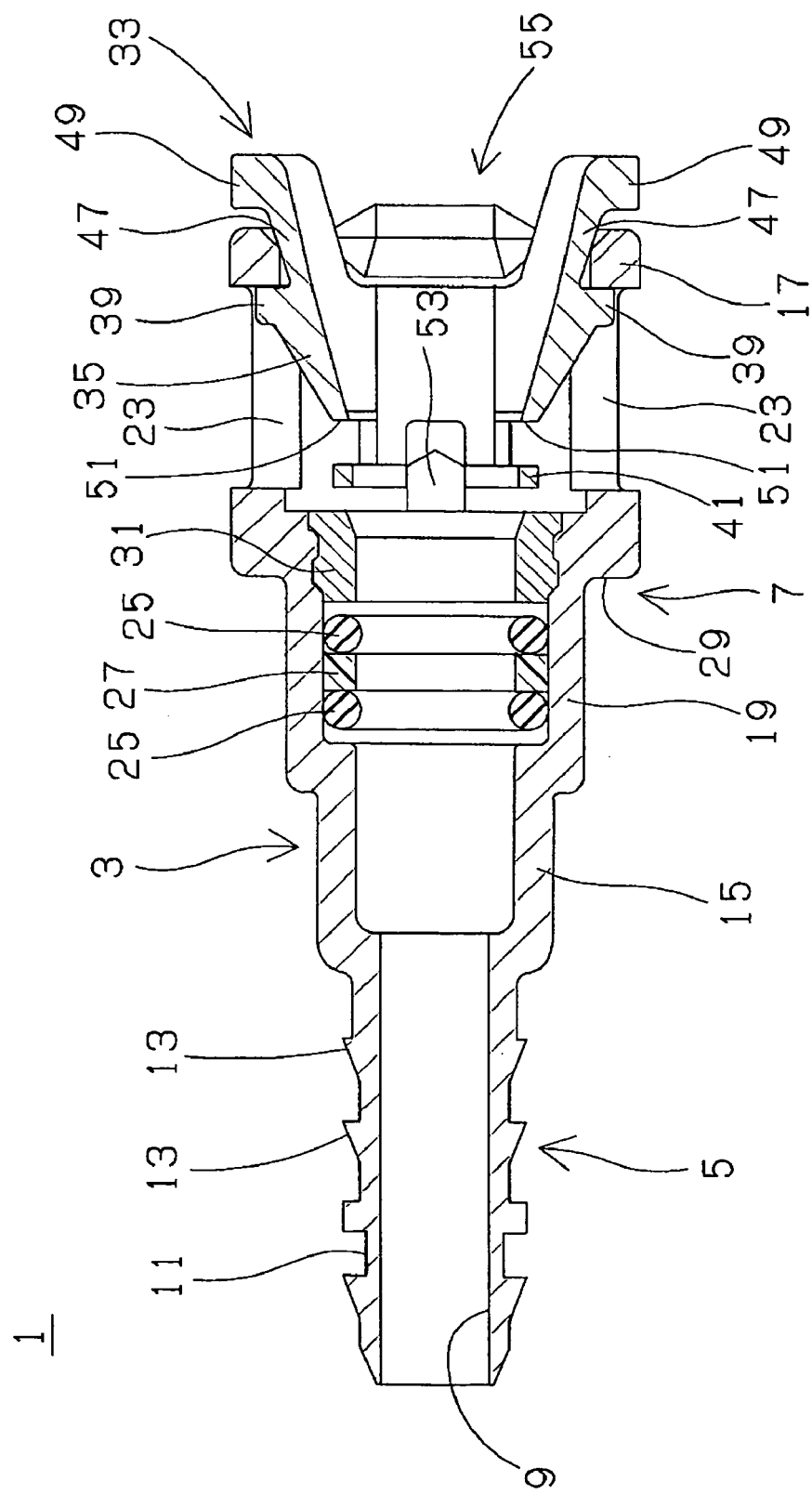
FIG. 2 is a sectional view of the connector.

As well shown in FIGS. 1 and 2, a connector or quick connector 1, to which a connector clip (cap) for verifying complete connection between a connector and a pipe or preventing incomplete connection between a connector and a pipe according to the present invention is applied, is used for joint construction in a gasoline fuel piping for vehicle. The connector 1 has a tubular connector housing 3, for example, made of glass fiber reinforced polyamide (PA/GF). The connector housing 3 includes a resin tube connecting portion 5 on one axial side thereof, a pipe inserting portion 7 on an opposite axial side thereof, and a through bore 9 through from an opposite axial end (rear end) of the pipe inserting portion 7 to one axial end (leading end) of the resin tube connecting portion 5. The resin tube connecting portion 5 is formed with a seal fit portion 11 on an outer peripheral surface thereof and two annular stop ribs 13 in axially spaced relation with one another on the outer peripheral surface. A seal ring (not shown) is fitted on the seal fit portion 11, then, a resin tube (not shown) of relatively high rigidity is tightly fittingly connected to an outer periphery of the resin tube connecting portion 5 of the connector 1.

The pipe inserting portion 7 has a cylindrical transitional portion 15 on one axial side thereof which is continued integrally to the resin tube connecting portion 5, a tubular holding portion 17 of large diameter (large diameter portion) on an opposite axial side thereof, and a cylindrical sealing portion 19 in the middle axially thereof, sized smaller than the tubular holding portion 17 in diameter, but larger than the cylindrical transitional portion 15 in diameter. An outer peripheral surface of the tubular holding portion 17 of the pipe inserting portion 7 includes planar portions 21 located in diametrically symmetrical positions thereof, and engagement windows 23 formed in opposed relations with one another in arcuate peripheral wall portions arranged between the planar portions 21. In the cylindrical sealing portion 19 of the pipe inserting portion 7, a pair of O-rings 25 (sealing members) are fitted in axially side-by-side relation with a collar 27 therebetween within the inner peripheral surface thereof A stepped end surface 29 (one axial end surface of the large diameter portion) is defined on one axial end of an outer surface of the tubular holding portion 17 or between the outer peripheral surface of the tubular holding portion 17 and an outer peripheral surface of the cylindrical sealing portion 19. A numeral reference 31 in FIG. 2 indicates a resin bush which is fitted over an inner peripheral surface of the tubular holding portion 17 and an inner peripheral surface of the cylindrical sealing portion 19 to prevent displacement of the O-rings 25.

Figure 3:
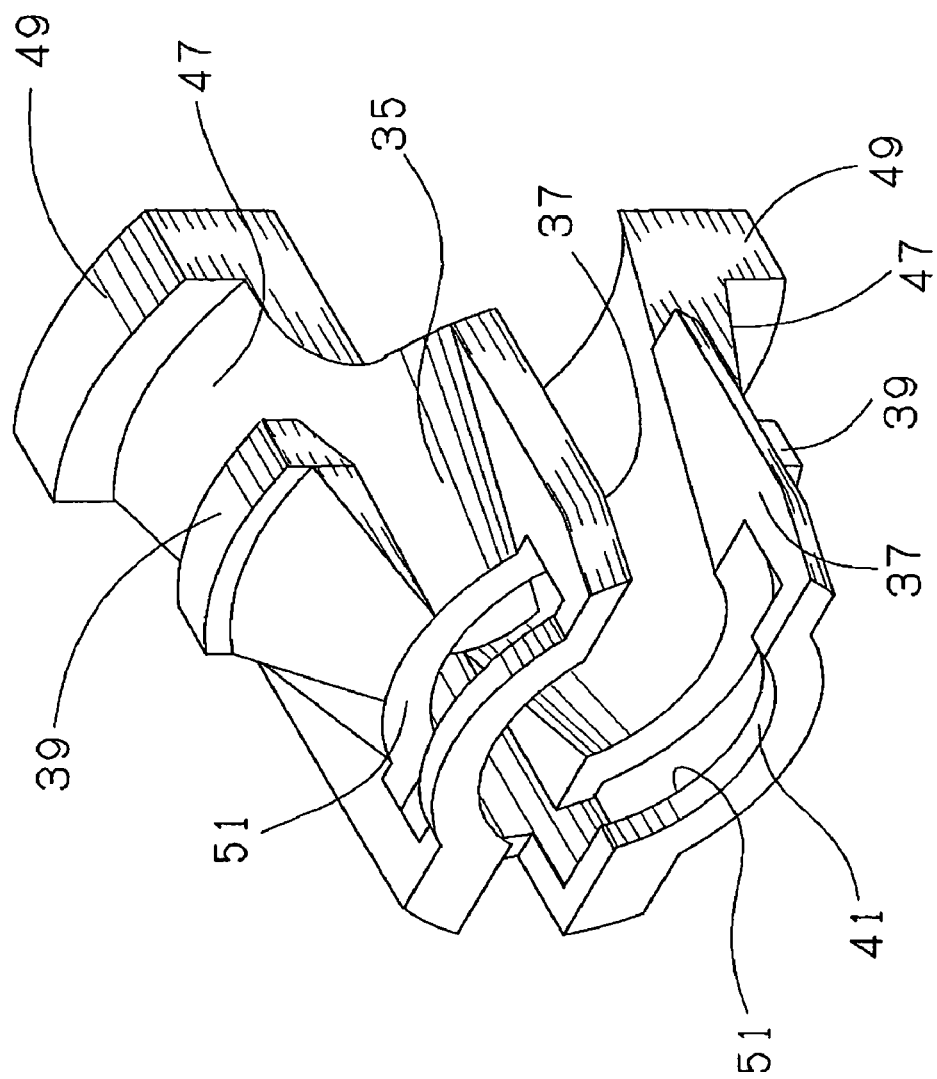
FIG. 3 is a perspective view of a retainer to be fitted in the connector.

A retainer 33, for example, made of PA is fitted in the tubular holding portion 17 of the pipe inserting portion 7. This retainer 33 is relatively flexible, and is formed so as to be resiliently deformable. As well understood with reference to FIG. 3, the retainer 33 has a main body 35 of C-shape in cross-section wherein a relatively large space for deformation is defined between circumferentially opposite end portions 37 thereof. The main body 35 is provided with a pair of stopper portions 39 projecting radially outwardly in diametrically symmetrical positions in an opposite axial end portion thereof. An inner surface of the main body 35 tapers generally in the direction to one axial side thereof so as to reduce gradually an inner diameter thereof except the circumferentially opposite ends 37 and a portion opposed to the space for deformation. One axial end portion of the main body 35 serves as an engagement portion 41, generally defining an inner diameter smaller than an outer diameter of an annular engagement projection 43 around an outer peripheral surface of one axial side or an inserting or insertion end portion of the pipe 45 (refer to FIG. 4), and substantially identical to an outer diameter of a body of the pipe 45, except the circumferentially opposite ends 37 and a portion opposed to the space for deformation.

A pair of operation arms 47 are integrally formed on an opposite axial end of the main body 35 of the retainer 33 so as to extend inclining radially outwardly in an opposite direction axially from respective circumferential positions corresponding to the stopper portions 39. The operation arms 47 have latching ends 49 projecting radially outwardly on an opposite axial end portions thereof respectively. The engagement portion 41 of the main body 35 is provided with a pair of engagement slits 51 extending circumferentially in opposed relation with one another. Thus configured retainer 33 is inserted and fitted in the tubular holding portion 17 of the pipe inserting portion 7, so that the stopper portions 39 are seated in the engagement windows 23 and that the latching ends 49 are in engagement relation with the tubular holding portion 17 on an opposite axial end thereof A numeral reference 53 in FIG. 2 indicates rotational movement restraint projection integrally which is formed in an inner surface of the tubular holding portion 17. The rotational movement restraint projection 53 is configured to seat in a cutaway of the retainer 33 to prevent rotational movement of the retainer 33.

Figure 4:
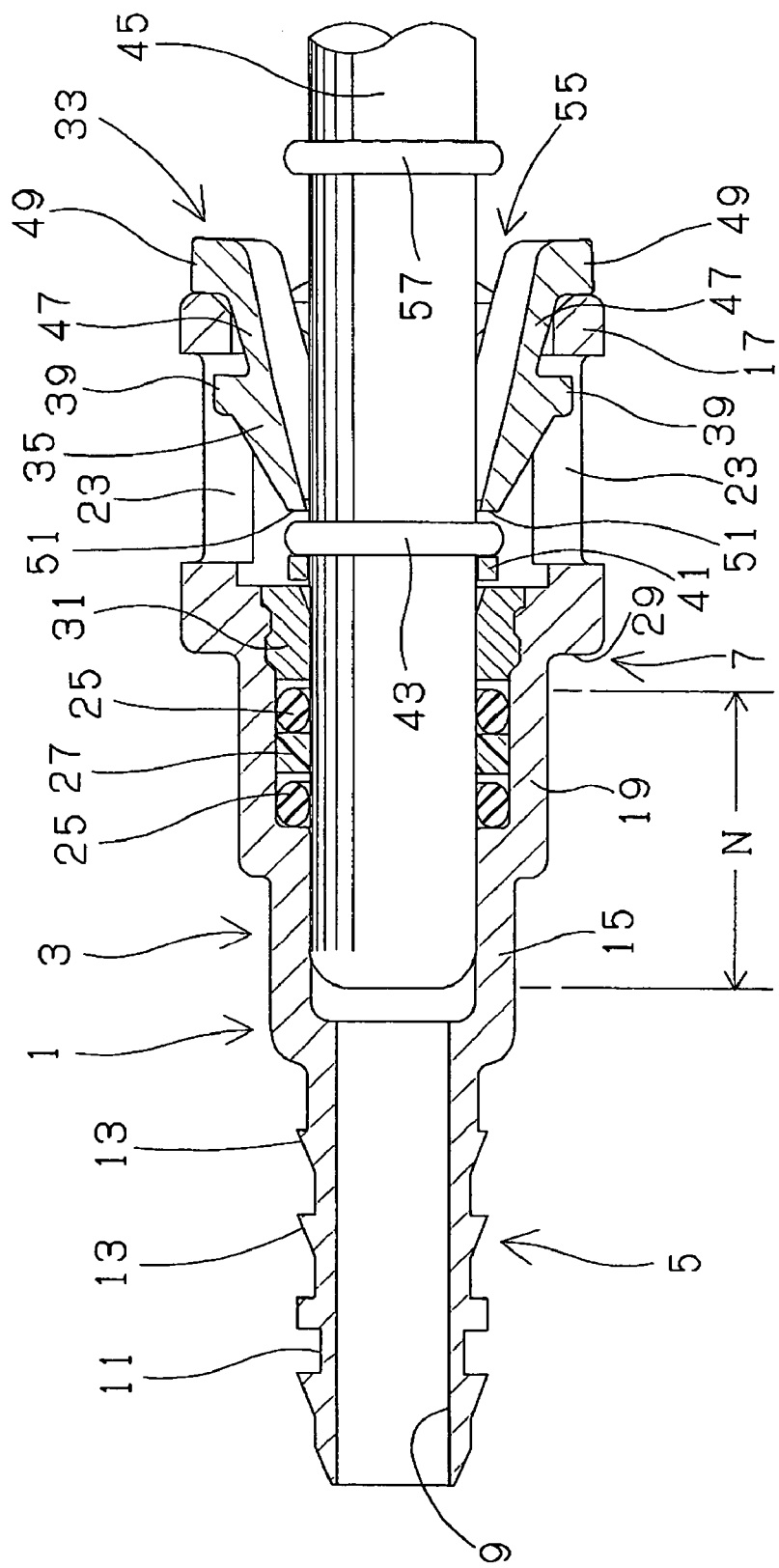
FIG. 4 is a sectional view showing the case that a pipe is inserted in and connected to the connector.

As well understood with reference to FIG. 4, the pipe 45 to be jointed to a resin tube is relatively pushed, and fittingly inserted into an opening 55 on an axial end of the pipe inserting portion 7 of the connector housing 3 or the connector 1 so that the annular engagement projection 43 progresses radially expanding an inner surface of the main body 35 of the retainer 33 until the annular engagement projection 43 seats in the engagement slits 51 in snap-engagement relation therewith. The pipe 45 is further provided with an annular verification projection 57 with same or substantially same configuration as the annular engagement projection 43 on an outer peripheral surface of an opposite axial side of (from or beyond) the annular engagement projection 43. The annular verification projection 57 is arranged on the pipe 45 so as to be located axially outer side or an opposite axial side of or beyond the opening 55 on an axial end of the pipe inserting portion 7 or the latching end 49 of the retainer 33, while the pipe 45 is correctly inserted in and fittingly connected to the connector 1 so that the annular engagement projection 43 seats in and engages in the engagement slits 51 of the retainer 33. The annular engagement projection 43 which has fitted in and snap-engaged with the engagement slits 51 of the main body 35 of the retainer 33 blocks or limits further axial in-and-out movement of the pipe 45 with respect to the connector 1. That is, the pipe 45 is thereby almost locked against relative axial movement in the connector 1. One axial end or an inserting or insertion end of the pipe 45 reaches in the cylindrical transitional portion 15 beyond a pair of the O-rings 25 within the cylindrical sealing portion 19, and thereby a seal is formed by the O-rings 25 between an outer peripheral surface of the pipe 45 and the inner peripheral surface of the pipe inserting portion 7 of the connector housing 3

In the event of removing the pipe 45 from the connector 1, the latching ends 49 of the operating arms 47 of the retainer 33 are pressed radially inwardly from outside to narrow a radial space between the operating arms 47 thus a radial space between the stopper portions 39. And, thereby the stopper portions 39 are out of the engagement windows 23 and the retainer 33 can be relatively pulled out of the connector housing 3. As the retainer 33 is relatively pulled out of the connector 1, the pipe 45 is also pulled out of the connector housing 3 along with the retainer 33.

Figure 5:
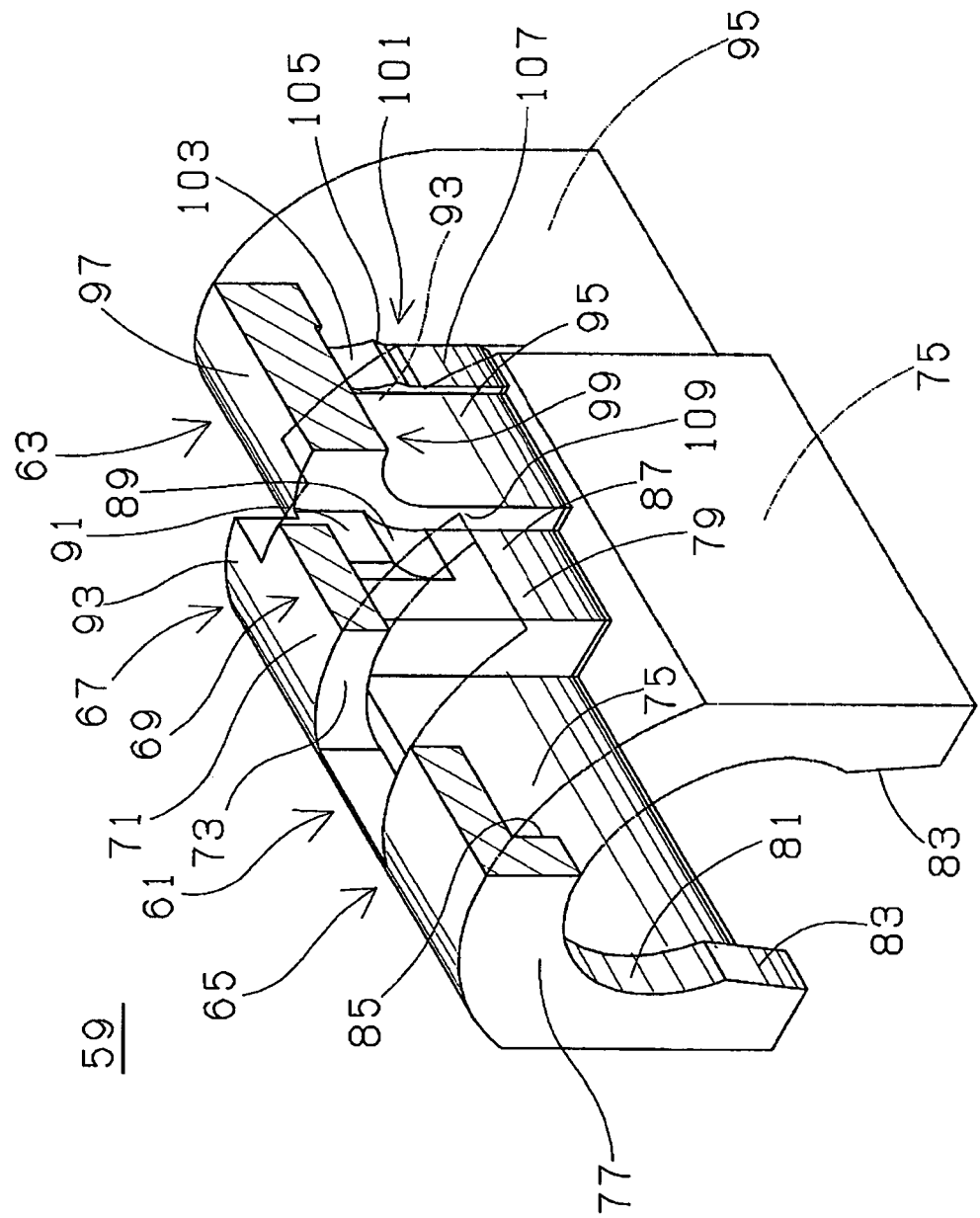
FIG. 5 is a perspective sectional view of the connector clip for verifying complete connection between a connector and a pipe according to the present invention.
Figure 6:
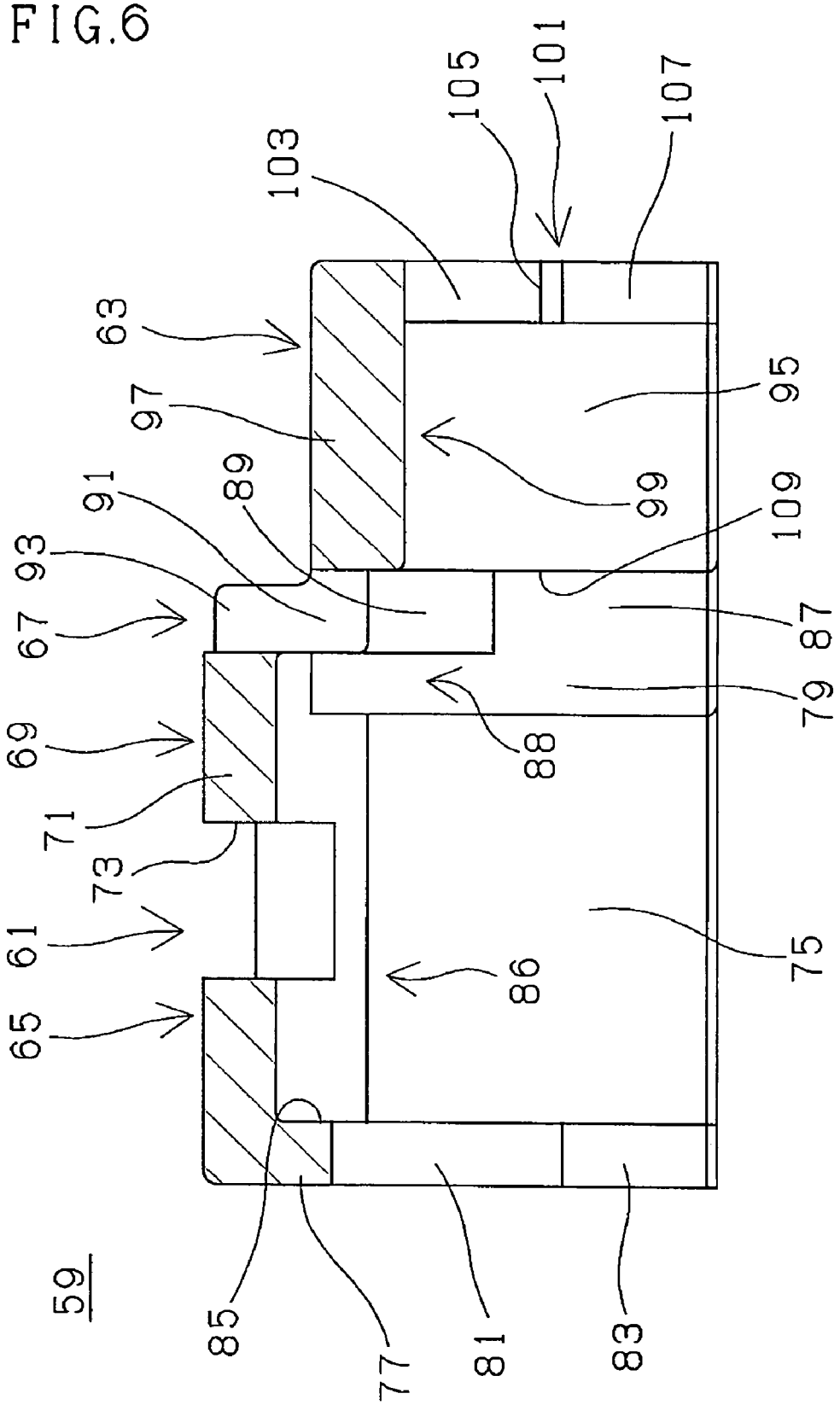
FIG. 6 is a sectional view of the connector clip for verifying complete connection between a connector and a pipe according to the present invention.

For a connector clip (cap) 59 for verifying complete connection between a connector and a pipe, shown in FIGS. 5 and 6, to be put on and mounted to the connector 1 and the pipe 45, thermoplastic resin is widely used as material. If heat resistant property is required, polyamide type resin such as PA11, PA12 and PA66 or nylon is adapted. Polypropylene type resin such as PP or polyester type resin may be adapted to achieve cost reduction.

The connector clip 59 is constructed overall in a form of U-shape in cross-section so as to be put on and mounted to the connector housing 3 and the pipe 45 via a side of a U-shaped opening or U-shaped open extending longitudinally or axially of the connector housing 3 and the pipe 45. The connector clip 59 has a clip body (cap body) 61 of U-shape in cross-section on one axial side thereof, and a connection verifying portion 63 also of U-shape in cross-section on an opposite axial side thereof as a unit. The clip body 61 is intended to receive a held portion from the tubular holding portion 17 of the connector housing 3 or the stepped end surface 29 of the tubular holding portion 17 to the annular verification projection 57 of the pipe 45. On the other hand, the connection verifying portion 63 is intended to fit on and receive an opposite axial side of the annular verification projection 57 with respect to the pipe 45.

The clip body 61 includes a connector receiving portion 65 for receiving a side of the connector 1 and a projection receiving portion 67 connected integrally to an opposite axial end of the connector receiving portion 65. And, the connection verifying portion 63 is connected integrally to an opposite axial end of the projection receiving portion 67.

The connector receiving portion 65 has a receiving body 69 including an arcuate wall portion 71 curved through an arc of smaller or slightly smaller than 180° and formed with a drain opening 73 on a mid portion thereof and a pair of flat side wall portions 75 connected integrally to the arcuate wall portion 71 on widthwise opposite ends thereof The connector receiving portion 65 also has an inwardly directed extending portion 77 and a pair of inwardly raised portions 79 (only one inwardly raised portion is shown). The inwardly directed extending portion 77 is formed of U-shape and integrally on the receiving body 69 at one axial end thereof so as to extend slightly inwardly. The inwardly raised portions 79 are formed integrally on inner surfaces of the flat side wall portions 75 at opposite axial end portions thereof so as to be raised slightly inwardly and extend along opposite axial ends of the flat side wall portions 75 respectively. The arcuate wall portion 71 is formed to have an inner surface corresponding to an outer surface of the arcuate peripheral wall portion of the tubular holding portion 17. A pair of the flat side wall portions 75 are arranged parallel to each other and with a space generally equal to that between a pair of the planer portions 21 of the tubular holding portion 17. A U-shaped inner edge of the inwardly directed extending portion 77 defines an arcuate fit-on portion 81 and a lead-in portion 83. The arcuate fit-on portion 81 is formed in an arc of slightly larger than 180°, with an inner diameter equal to or generally equal to an outer diameter of the cylindrical sealing portion 19 of the connector housing 3, and open toward a U-shaped opening side. The lead-in portion 83 is extending so as to be widened gradually from opening ends of the fit-on portion 81 to ends of the U-shaped opening. Each of the inwardly raised portions 79 is designed to be raised at height slightly larger than a wall thickness of the tubular holding portion 17 of the connector housing 3. And, a distance between a pair of the inwardly raised portions 79 is designed slightly larger than a width of the latching end 49 of the retainer 33.

A distance between an opposite axial side surface or inside surface 85 (one clip portion) of the inwardly directed extending portion 77 and one axial side surface or inside surface of the inwardly raised portion 79 is designed equal to or generally equal to an axial length of the tubular holding portion 17 of the connector housing 3. The connector receiving portion 65 internally defines a connector receptacle portion or a connector inner receiving portion 86 of U-shape in cross-section to embrace and receive the tubular holding portion 17 from both axial ends thereof between the opposite axial side surface 85 of the inwardly directed extending portion 77 and one axial side surfaces of the inwardly raised portions 79. The connector receiving portion 65 also internally defines a retainer receptacle portion or a retainer inner receiving portion 88 of U-shape or U-shape in cross-section to receive the latching end 49 of the retainer 33 between a pair of the inwardly raised portions 79.

The projection receiving portion 67 has a pair of side wall portions 87 (only one side wall portion is shown) and a pair of arcuate portions 89 (only one arcuate portion is shown) connected integrally to respective side wall portion 87 on ends opposite to a U-shaped opening side and extending circumferentially slightly, concentric with the arcuate wall portion 71, and thereby the projection receiving portion 67 internally has a projection receptacle portion of U-shape with cut at top side or U-shape with cut at top side in cross-section. The side wall portions 87 are connected integrally to the opposite axial end surfaces or ends of respective inwardly raised portions 79, have inner surfaces co-planer with inner surfaces of the inwardly raised portions 79 and extend slightly in an opposite axial direction. A distance between a pair of side wall portions 87 is designed generally equal to an outer diameter of the annular verification projection 57, and an inner surface or a curved inner surface of the arcuate portion 89 is formed with curvature radius or inner diameter (radius) identical to or generally identical to outer diameter (radius) of the annular verification projection 57. Also, a drain hole 91 is formed between top end portions of a pair of the arcuate portions 89. Outer surfaces of the arcuate portions 89 are formed integrally with ridge-like portions 93 which close up a gap to be defined between the arcuate portions 89 and an opposite axial end of the arcuate wall portion 71. A distance between top end portions of a pair of the arcuate portions 89 and between a pair of the ridge-like portions 93 is designed smaller than a width of the latching end 49 of the retainer 33.

The connection verifying portion 63 integrally has a pair of cap side-wall portions 95 (restraining portion) and an arcuate wall portion 97. A pair of the cap side-wall portions 95 are connected integrally to an opposite axial end of each of the side wall portions 87 of the projection receiving portion 67. The arcuate wall portion 97 is connected integrally to ends of the cap side-wall portions 95 opposite to the U-shaped opening so as to extend or bridge therebetween, concentric with the arcuate wall portion 71 and the arcuate portion 89. The connection verifying portion 63 has a receiving recess (hollow) of U-shape in cross-section defined to receive an opposite axial side of (from or beyond) the annular verification projection 57 with respect to the pipe 45. A width of the receiving hollow or a distance between a pair of the cap side-wall portions 95 is designed generally equal to an outer diameter of an opposite axial side of (from or beyond) the annular verification projection 57 with respect to the pipe 45 or a body thereof. The arcuate wall portion 97 includes an inner surface curved so as to have an inner diameter generally equal to an outer diameter of the body of the pipe 45 to define a fit-on portion 99 of the receiving hollow. The receiving hollow or an inner surface of the connection verifying portion 63 is formed integrally with a raised strip portion 101 of U-shape raising slightly inwardly on an opposite axial end portion thereof. An inner surface of the raised strip portion 101 of U-shape defines an embracing portion 103 of semicircle shape with opening on a U-shaped opening side, a pair of snap ridges 105 continued to ends of an opening of the embracing portion 103 and a lead-in portion 107 extending from the snap ridges 105 to ends of the U-shaped opening generally at constant width. An inner diameter of the embracing portion 103 is designed equal to or generally equal to an outer diameter of the body of the pipe 45.

The receiving hollow of the connection verifying portion 63 is formed on an inner side from an inner surface of the projection receiving portion 67. Therefore, on one axial end of the connection verifying portion 63 or an opposite axial end of the clip body 61, a U-shaped end surface 109 (opposite clip portion) is defined so as to extend more inwardly than an inner surface of the projection receiving portion 67. And, an axial length of the connection verifying portion 63 or the cap side-wall portion 95 is designed shorter than an axial length between the annular engagement projection 43 and the annular verification projection 57 of the pipe 45, but equal to an axial distance between an inserting or insertion end of the pipe 45 and an opposite axial end of the O-ring 25 located on an opposite axial side during complete connection.

Figure 7:
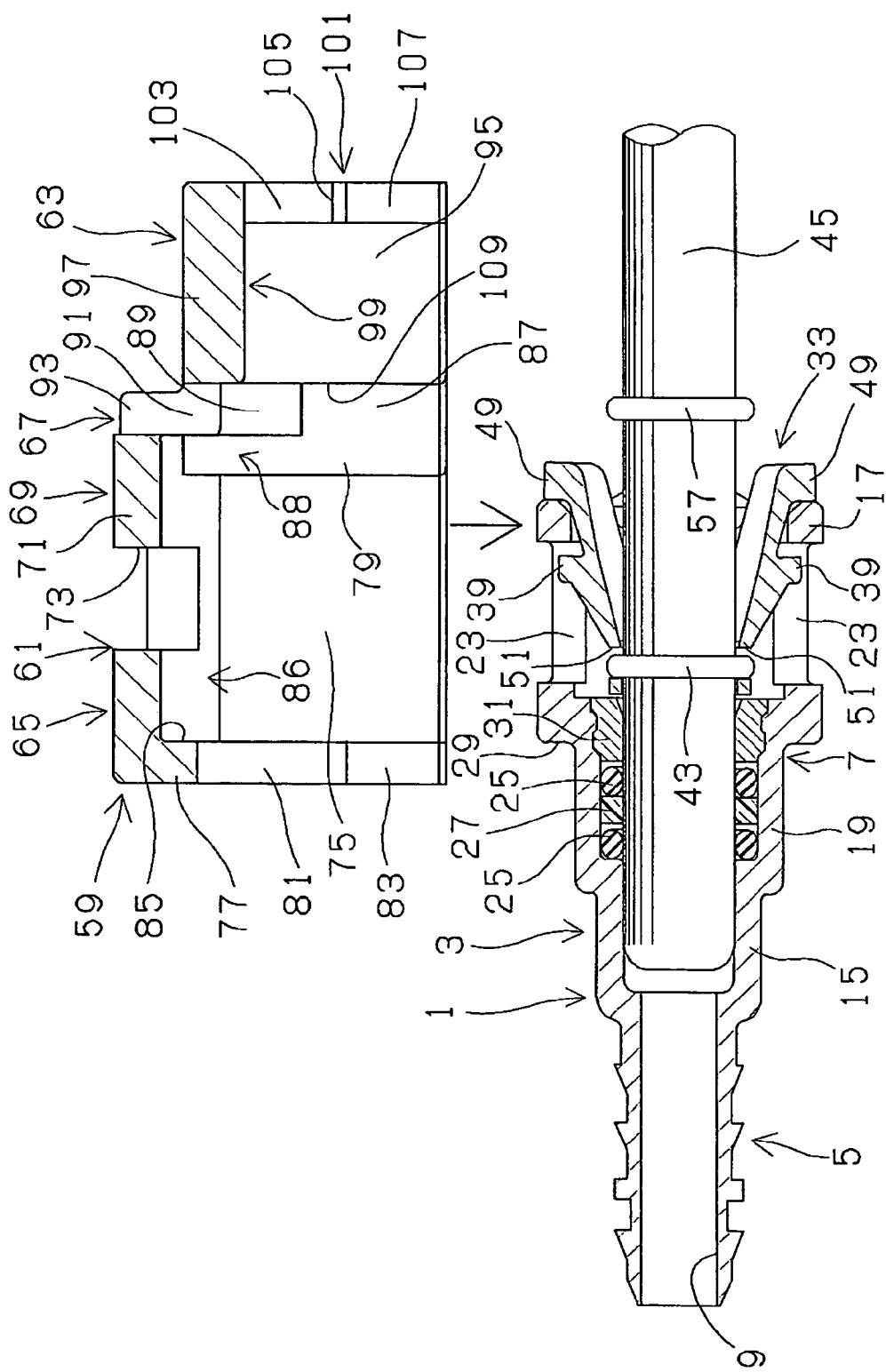
FIG. 7 is an explanatory view showing the case that the connector clip for verifying complete connection between a connector and a pipe according to the present invention is to be mounted to the connector and the pipe.
Figure 8:
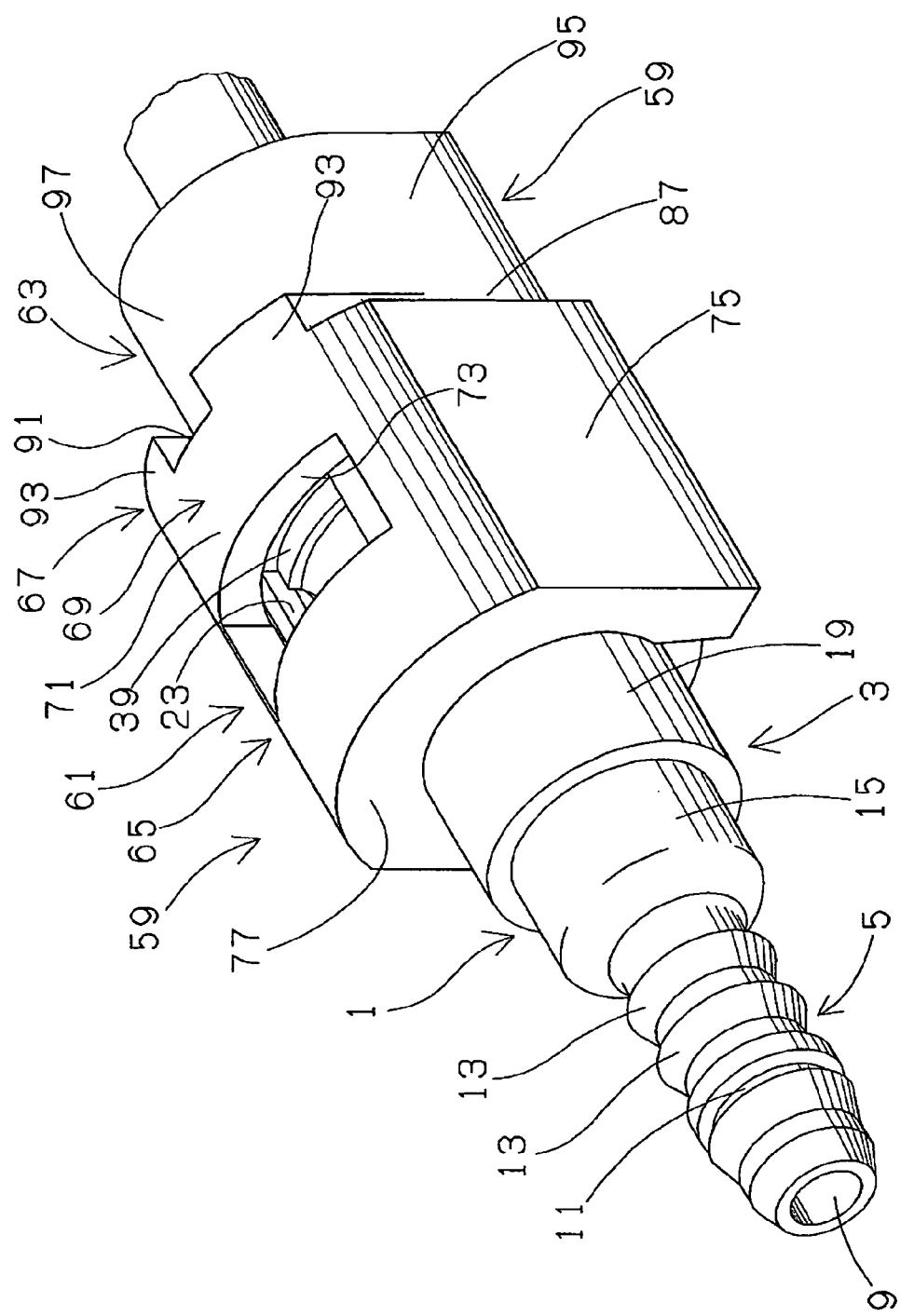
FIG. 8 is a perspective view showing the case that the connector clip for verifying complete connection between a connector and a pipe according to the present invention is mounted to the connector and the pipe.
Figure 9:
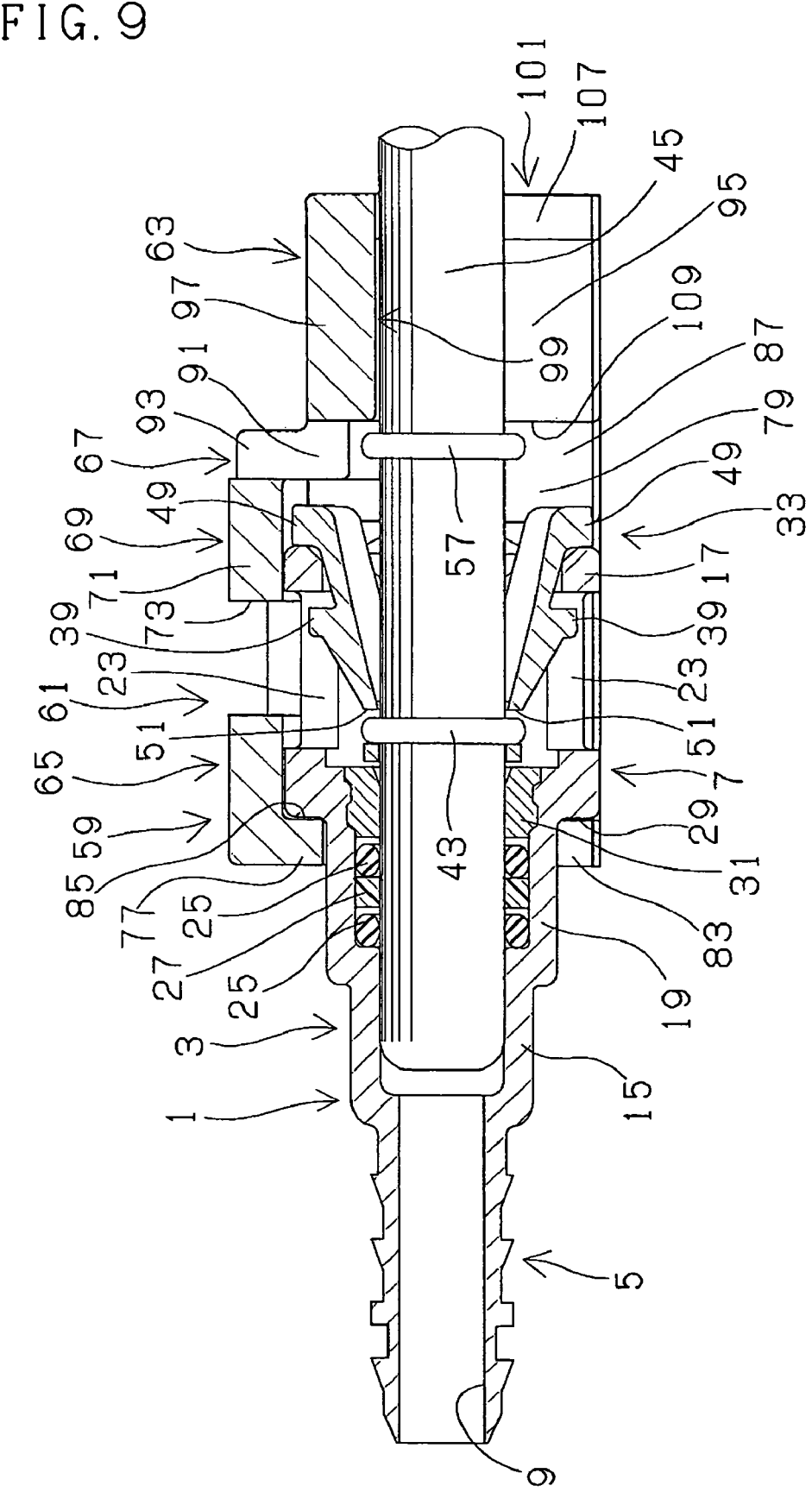
FIG. 9 is a sectional view showing the case that the connector clip for verifying complete connection between a connector and a pipe according to the present invention is mounted to the connector and the pipe.

As shown in FIG. 7, the connector clip 59 is mounted to or on the connector 1 and the pipe 45 so as to locate a pair of the flat side wall portions 75 of the connector receiving portion 65 to correspond to the planar portions 21 of the tubular holding portion 17 of the connector 1. As understood also from FIGS. 8 and 9, on the occasion of mounting the connector clip 59, a portion of the cylindrical sealing portion 19, adjacent to the tubular holding portion 17, is passed or moved through the lead-in portion 83 of the inwardly directed extending portion 77 and is snap-fitted in the fit-on portion 81. The tubular holding portion 17 is received in the connector receptacle portion 86 of the connector receiving portion 65, and the latching ends 49 of the retainer 33 are received in the retainer receptacle portion 88 of the connector receiving portion 65. The annular verification projection 57 of the pipe 45 is passed through or moved between a pair of side wall portions 87 of the projection receiving portion 67 and is fitted in the arcuate portions 89. The opposite axial side of (from or beyond) the annular verification projection 57 is also passed through or moved between a pair of the cap side-wall portions 95 of the connection verifying portion 63 and is fitted in the fit-on portion 99. By mounting the connector clip 59 thereto, a held portion between the tubular holding portion 17 or the stepped end surface 29 and the annular verification projection 57 of the pipe 45 is held from axial opposite ends by the opposite axial side surface 85 of the inwardly directed extending portion 77 and the end surface 109 of the connection verifying portion 63 or the clip body 61, and thereby the pipe 45 is certainly preventing from escaping the connector 1. In the opposite axial side portion of the receiving hollow of the connection verifying portion 63, the pipe 45 is passed or moved through the lead-in portion 107 of the raised strip portion 101 and is snap-fitted in the embracing portion 103. That is, the connector clip 59 is snap-fitted on or to the connector 1 and the pipe 45 so as to clip or hold the connector 1 and the pipe 45 radially.

Figure 10:
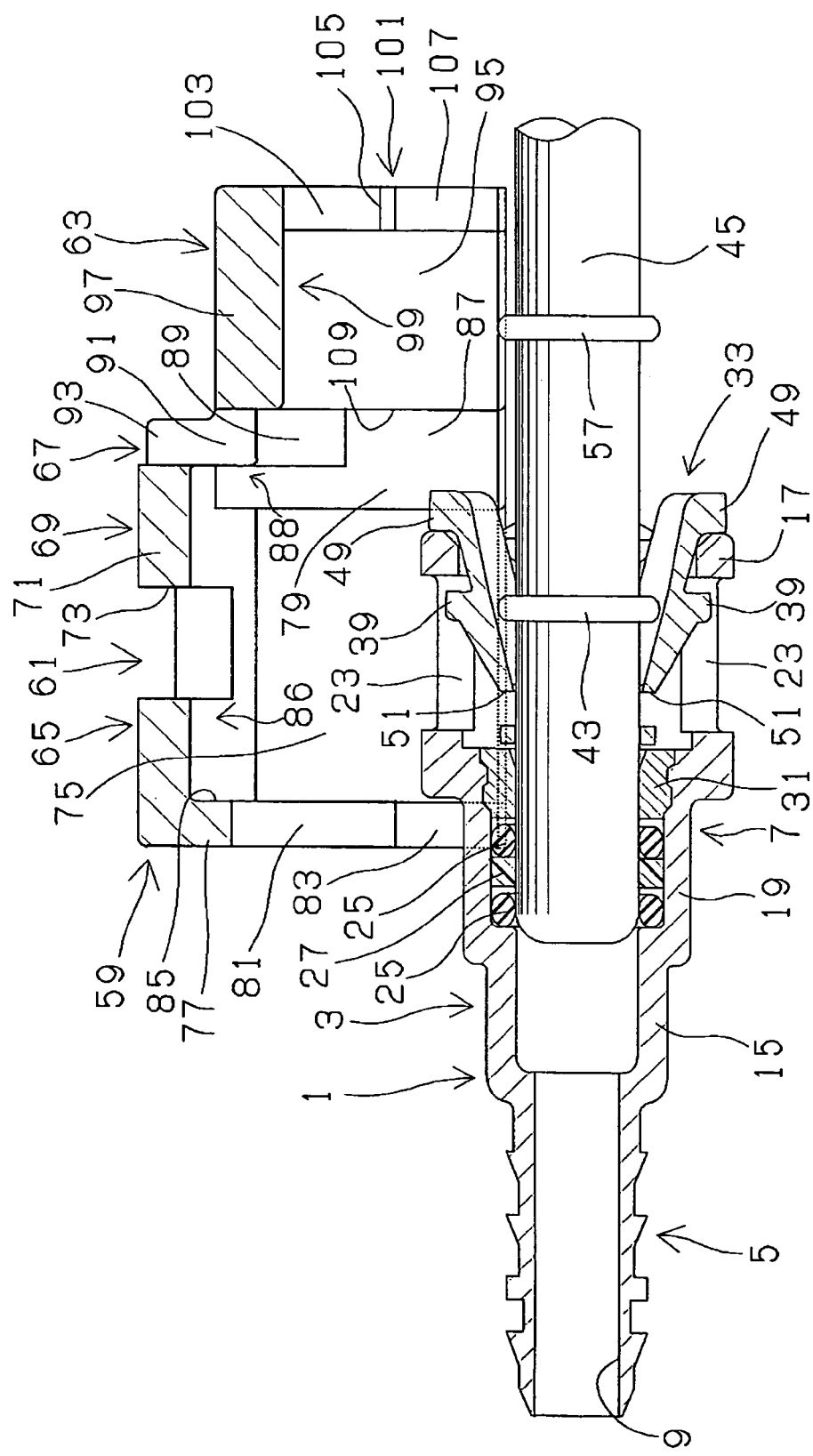
FIG. 10 is an explanatory view showing the case that the connector clip for verifying complete connection between a connector and a pipe according to the present invention is tried to be mounted to the connector and the pipe, when the pipe is incompletely connected to the connector.

Meanwhile, if the pipe 45 is not sufficiently inserted in the connector 1 or the retainer 33 and the annular engagement projection 43 of the pipe 45 does not engage in the engagement slits 51, 51 of the retainer 33, the annular verification projection 57 of the pipe 45 is located further apart toward an opposite axial direction from an opposite axial end of the connector housing 3, compared to the case that the pipe 45 is correctly connected to the connector 1. Therefore, as shown in FIG. 10, when the connector clip 59 is tried to be mounted to the quick connector 1 and the pipe 45 so that the tubular holding portion 17 is received in the connector receptacle portion 86 of the connector receiving portion 65, the annular verification projection 57 of the pipe 45 is not located so as to seat in the projection receiving portion 67 but on a side of the connection verifying portion 63 or in the connection verifying portion 63. However, as a width of the receiving hollow of the connection verifying portion 63 is designed smaller than an outer diameter of the annular verification projection 57 of the pipe 45, the annular verification projection 57 contacts with or abuts ends of the U-shaped opening of the connection verifying portion 63, and the pipe 45 cannot be received in the receiving hollow of the connection verifying portion 63. Therefore, the connector clip 59 cannot be fitted to the connector 1 and the pipe 45.

Figure 11:
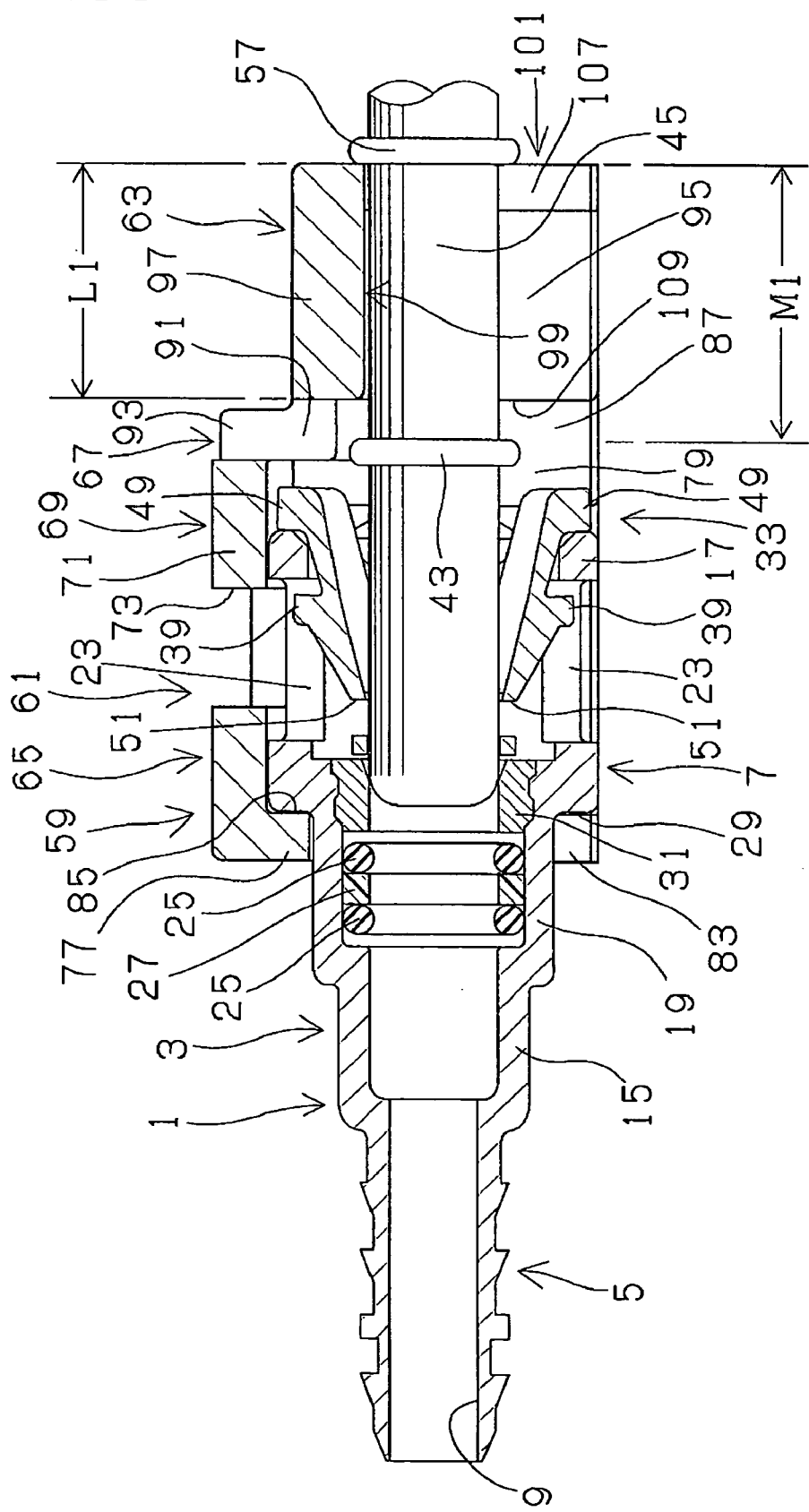
FIG. 11 is a sectional view showing the case that the connector clip for verifying complete connection between a connector and a pipe according to the present invention is successfully mounted to the connector and the pipe although the pipe is incompletely connected to the connector.

And, if the pipe 45 is not sufficiently inserted in the connector 1 or the retainer 33, and the annular verification projection 57 of the pipe 45 is located far apart from an opposite axial end of the connector housing 3 toward an opposite axial direction, as an axial length (L1 in FIG. 11) of the connection verifying portion 63 of the connector clip 59 is designed shorter than an axial length (M1 in FIG. 11) between the annular engagement projection 43 and the annular verification projection 57 of the pipe 45, the connector clip 59 possibly happens to be mounted to the connector 1 and the pipe 45 as shown in FIG. 11. Here, the tubular holding portion 17 is received in the connector receptacle portion 86 of the connector receiving portion 65, the annular engagement projection 43 of the pipe 45 is received, for example, in the projection receiving portion 67, the annular verification projection 57 of the pipe 45 is located on an opposite axial side of (from or beyond) the connection verifying portion 63 and a portion between the annular engagement projection 43 and the annular verification projection 57 with respect to the pipe 45 is received in the receiving hollow of the connector verifying portion 63. However, even if such case happens, as an axial length (L1) of the connection verifying portion 63 is designed equal to an axial distance (N in FIG. 4) between an inserting or insertion end of the pipe 45 and an opposite axial end of the O-ring 25 on an opposite axial side during complete connection, the annular verification projection 57 is located much toward an opposite axial direction by a length longer than an axial distance (N) between the inserting end of the pipe 45 completely connected to the connector 1 and an opposite axial end of the O-ring 25 on an opposite axial side, compared to the case that the pipe 45 is correctly connected to the connector 1. That is, the inserting end of the pipe 45 is located rearwardly or retracted away from the O-ring 25 on an opposite axial side toward an opposite axial direction, and thereby no seal is provided between the connector housing 3 and the pipe 45. In this state, if an inspection fluid is flowed in the pipe 45, the inspection fluid leaks out between the pipe 45 and the connector 1, and thereby it is verified that the pipe 45 is insufficiently or incompletely connected to the connector 1. Even if the connector clip 59 is mounted to the connector 1 and the pipe 45 with a U-shaped opening side upward, as an inspection fluid is discharged through the drain opening 73 or the drain hole 91, it can be easily verified that the pipe 45 is incompletely connected to the connector 1.

Figure 12:
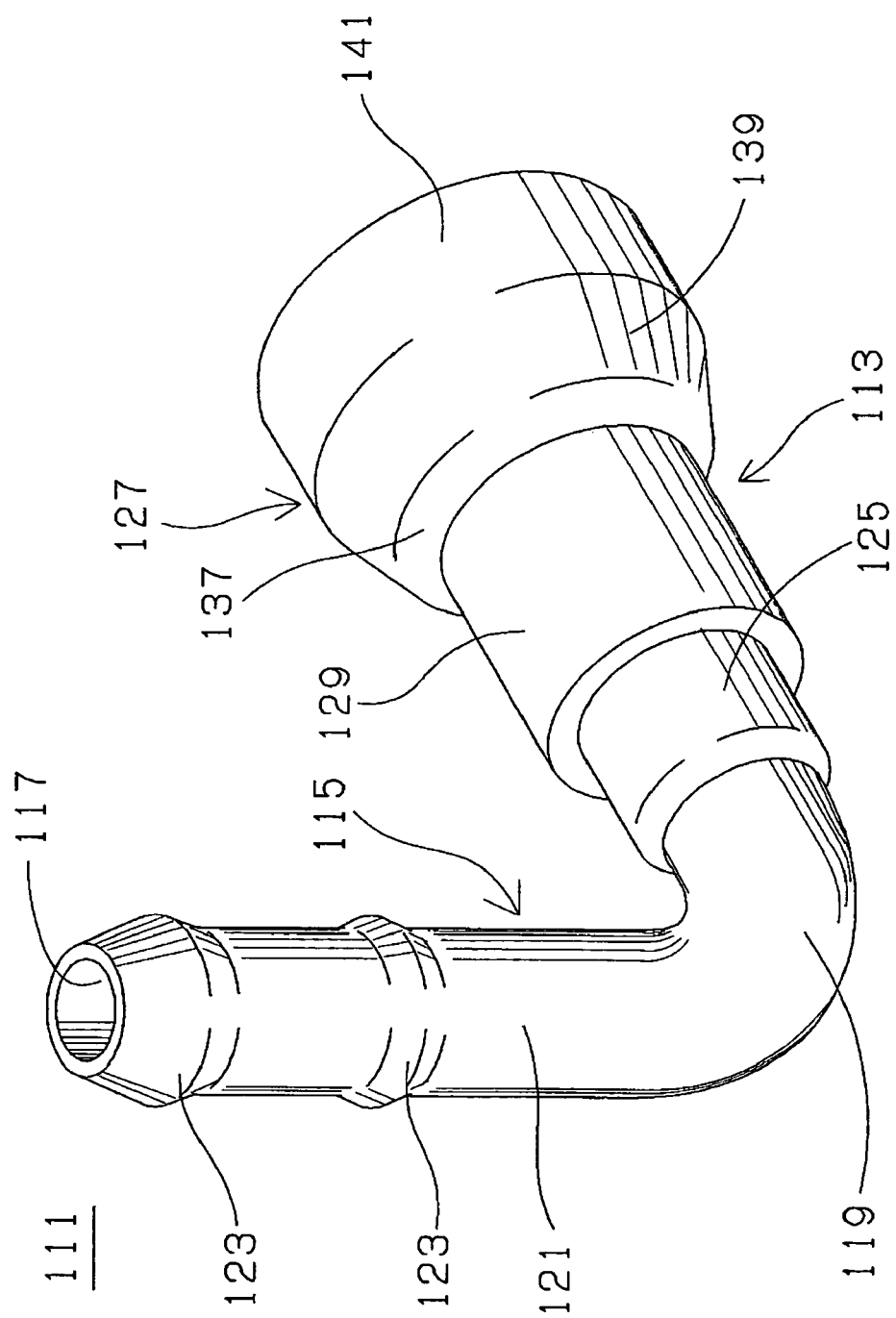
FIG. 12 is a perspective view of another connector to which another connector clip for verifying complete connection between a connector and a pipe according to the present invention is applied.
Figure 13:
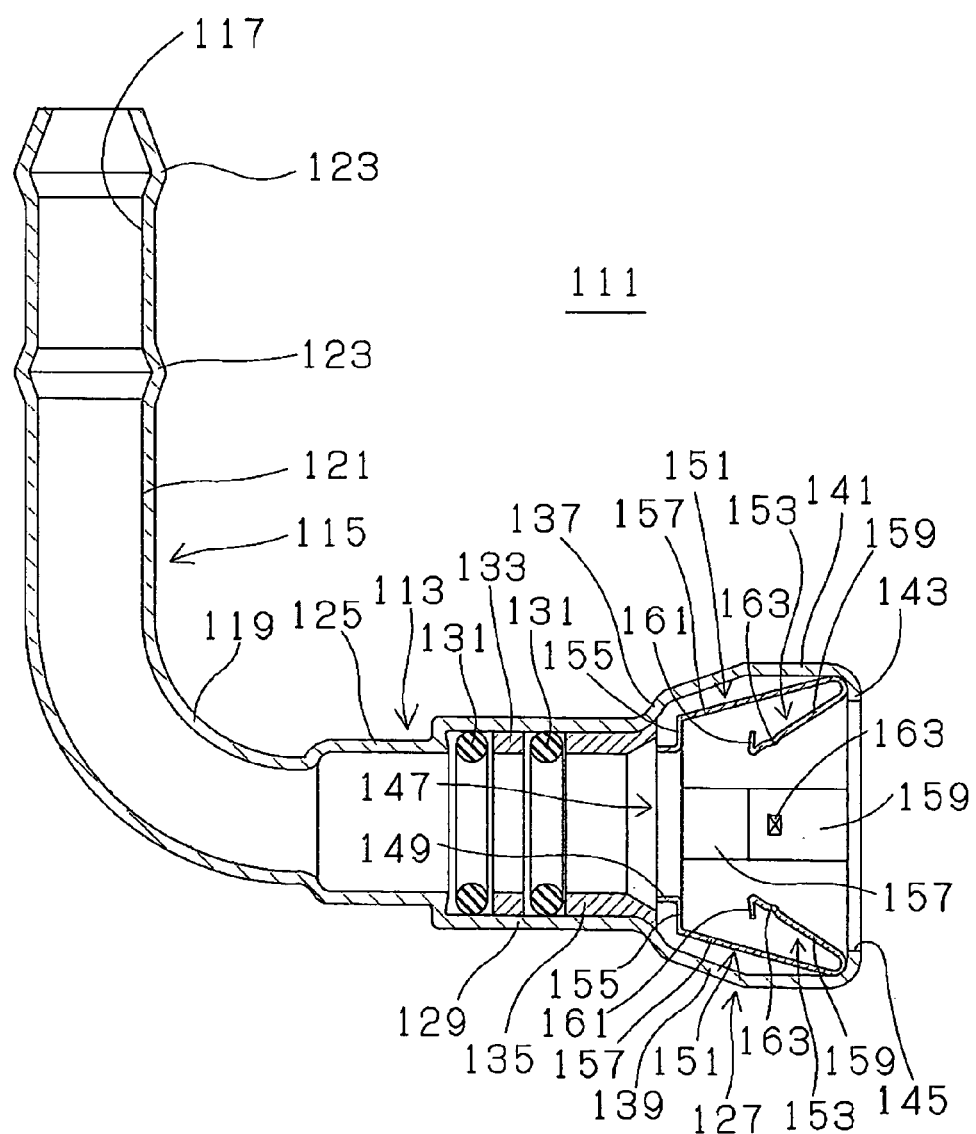
FIG. 13 is a sectional view of the another connector.

As well shown in FIGS. 12 and 13, another connector or another quick connector 111, to which another connector clip for verifying complete connection between a connector and a pipe according to the present invention is applied, is also used for joint construction in a gasoline fuel piping for vehicle. The another connector 111 has a tubular connector housing 113 made of metal, a tube connecting portion 115 made of metal to be fitted in a rubber hose (not shown) integrally on one axial side of, from or beyond the tubular connector housing 113, and a through bore 117 through from an opposite axial end (rear end) of the connector housing 113 to a leading end of the tube connecting portion 115. The tube connecting portion 115 includes a bent portion 119 continued integrally from one axial end of the connector housing 113 and curved at 90° with respect to an axis of the connector housing 113, and a straight pipe portion 121 continued integrally from the bent portion 119 and extending in a direction perpendicular to an axis of the connector housing 113. The straight pipe portion 121 is formed with two annular stop ribs 123 projecting radially outwardly, axially spaced relation with one another.

The connector housing 113 has a cylindrical transitional portion 125 on one axial side thereof which is continued integrally to the tube connecting portion 115, an annular holding portion 127 of large diameter (large diameter portion) on an opposite axial side thereof, and a cylindrical sealing portion 129 in the middle axially thereof, sized smaller than the annular holding portion 127 in diameter, but larger than the cylindrical transitional portion 125 in diameter. In the cylindrical sealing portion 129, a pair of O-rings 131 (sealing members) are fitted axially in side-by-side relation with a collar 133 therebetween within the inner peripheral surface thereof A numeral reference 135 in FIG. 13 indicates a metal bush which is fitted in an inner peripheral surface of the cylindrical sealing portion 129 to prevent displacement of the O-rings 131.

The annular holding portion 127 has a base portion 137 continued integrally from an opposite axial end of the cylindrical sealing portion 129, an intermediate portion 139 continued integrally from an opposite axial end of the base portion 137, and an opening-side portion 141 continued integrally from an opposite axial end of the intermediate portion 139. The base portion 137 extends short in an opposite axial direction so as to diametrically enlarge steeply, the intermediate portion 139 extends in an opposite axial direction so as to diametrically enlarge gently, and the opening-side portion 141 extends in an opposite axial direction along an axis. The annular holding portion 127 further has an inwardly directed flange portion 143 integrally on an opposite axial end of the opening-side portion 141 so as to project slightly inwardly. An inner periphery of the inwardly directed flange portion 143 defines an insertion opening 145 (opening on an axial end).

A retainer 147 made of metal is fitted in the annular holding portion 127. This retainer 147 integrally has an annular foot portion 149 on one axial end portion thereof, four thin-walled plate-like support portions 151 extending from the foot portion 149 generally in an opposite axial direction, and thin-walled plate-like engagement portions 153 formed on the respective thin-walled plate-like support portions 151. Four support portions 151 extend in an opposite axial direction circumferentially equally spaced relation with one another, integrally from four circumferential points on an opposite axial end of the foot portion 149 respectively. The engagement portions 153 are continued integrally from opposite axial ends of the support portions 151, folded back radially inwardly, and extend in one axial direction respectively. Each of the support portions 151 includes an outwardly directed portion 155 extending in a radially outward direction, integrally from an opposite axial end of the foot portion 149, and a support body 157 extending in an opposite axial direction integrally from a radially outer end of the outwardly directed portion 155 so as to incline gently in a radially outward direction. The support body 157 is formed continuously and integrally with the engagement portion 153 on an opposite axial end thereof Here, an opposite axial end of the support body 157 or a fold back portion of the engagement portion 153 is in abutment relation with the inwardly directed flange portion 143. Consequently, the retainer 147 is retained in the annular holding portion 127 in locked relation against escaping movement. The engagement portion 153 includes an engagement body 159 folding back from the support body 157 and extending in one axial direction so as to incline gently in a radially inward direction, and an abutment portion 161 formed integrally on one axial end of the engagement body 159 and projecting radially outwardly. The engagement body 159 includes a release jut 163 jutting out radially inwardly, on a portion toward one axial end thereof.

Figure 14:
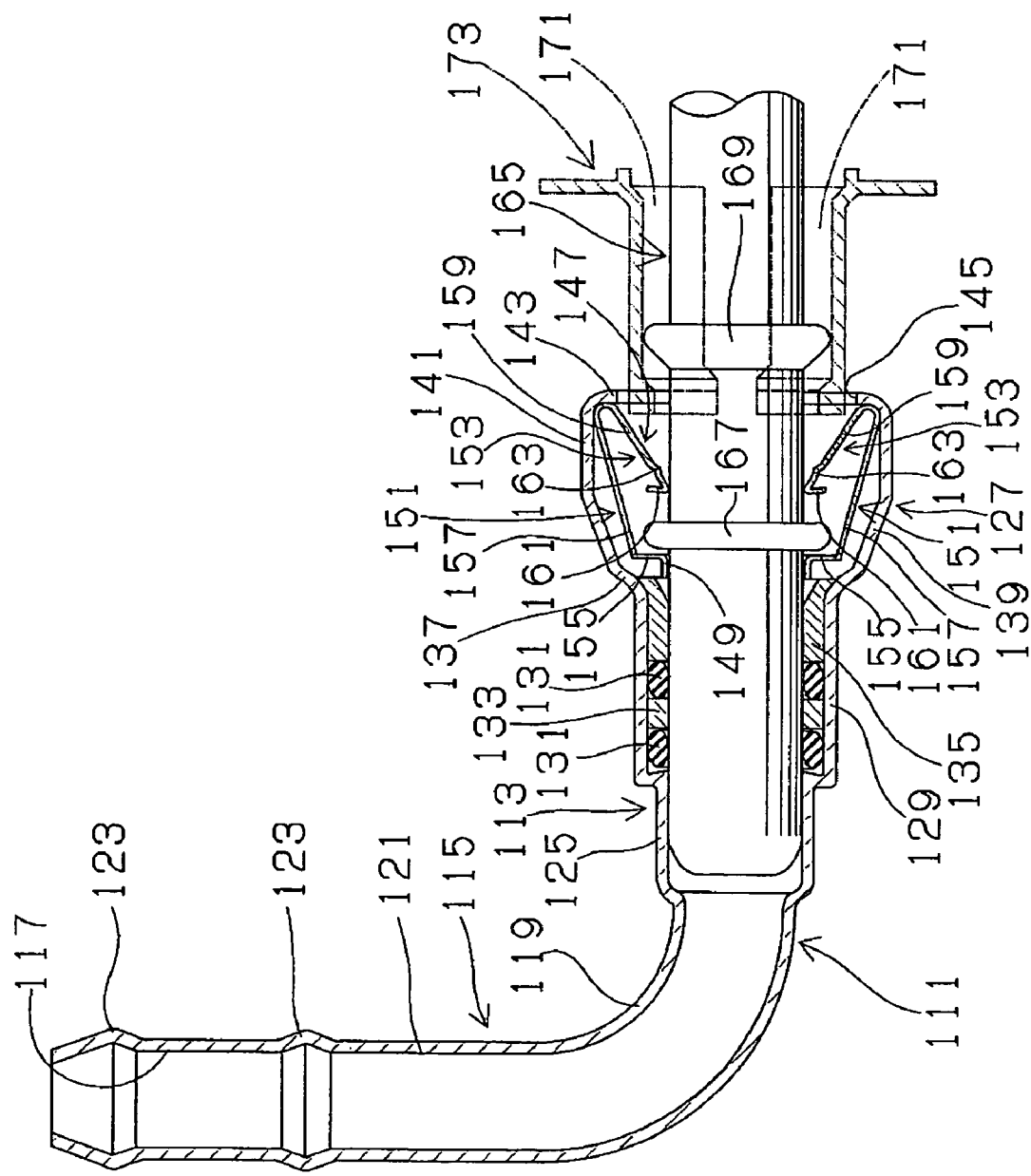
FIG. 14 is a sectional view showing the case that another pipe is inserted in and connected to the another connector.

As well understood with reference to FIG. 14, the another pipe 165 connected to the connector 111 as mating member is also formed with an annular engagement projection 167 on an outer peripheral surface of an inserting or insertion end portion thereof. The pipe 165 is relatively pushed, and fittingly inserted into an insertion opening 145 of the connector housing 113 or the connector 111 so that the annular engagement projection 167 progresses radially expanding inner surface of the engagement body 159 of the retainer 147 until the annular engagement projection 167 snap-engages with the abutment portion 161 of the engagement portion 153. The pipe 165 is further provided with an annular verification projection 169 with the same or substantially the same projecting height as the annular engagement projection 167 on an outer peripheral surface of an opposite axial side of the annular engagement projection 167. The annular verification projection 169 is arranged on the pipe 165 so as to be located on an axially outer side or an opposite axial side of the insertion opening 145 of the annular holding portion 127, while the pipe 165 is correctly inserted and connected to the connector 111 so that the annular engagement projection 167 snap-engages with the abutment portion 161 of the retainer 147. The pipe 165 is locked against escaping movement with respect to the connector 111 while the annular engagement projection 167 comes in snap-engagement relation with the abutment portion 161 of the engagement portion 153 of the retainer 147, that is, while the annular engagement projection 167 is located beyond the abutment portion 161 in one axial direction. And, the pipe 165 is locked against forward movement with respect to the connector 111 while the annular engagement projection 167 abuts the outwardly directed portion 155 of the support portion 151 of the retainer 147 and moves the retainer 147 in one axial direction, and one axial end portion of the retainer 147 abuts the bush 135 or the proximity of the bush 135. Here, one axial end or the insertion end of the pipe 165 reaches in the cylindrical transitional portion 125 beyond a pair of the O-rings 131 within the cylindrical sealing portion 129 and thereby a seal is formed by the O-rings 131 between an outer peripheral surface of the pipe 165 and an inner peripheral surface of the connector housing 113.

In the event of removing the pipe 165 from the connector 111, a pair of half-cylindrical portions 171 of a release devise 173 are inserted between the annular holding portion 127 and the pipe 165 so that one axial ends of the half-cylindrical portions 171 push the release jut 163 to widen the engagement body 159. Then, as an engagement relation between the abutment portion 161 of the engagement portion 153 and the annular engagement projection 167 is released, it becomes possible that the pipe 165 is relatively pulled out of the connector housing 113 (a pair of the half-cylindrical portions 171 of the release devise 173 are shown as widened in FIG. 14).

Figure 15:
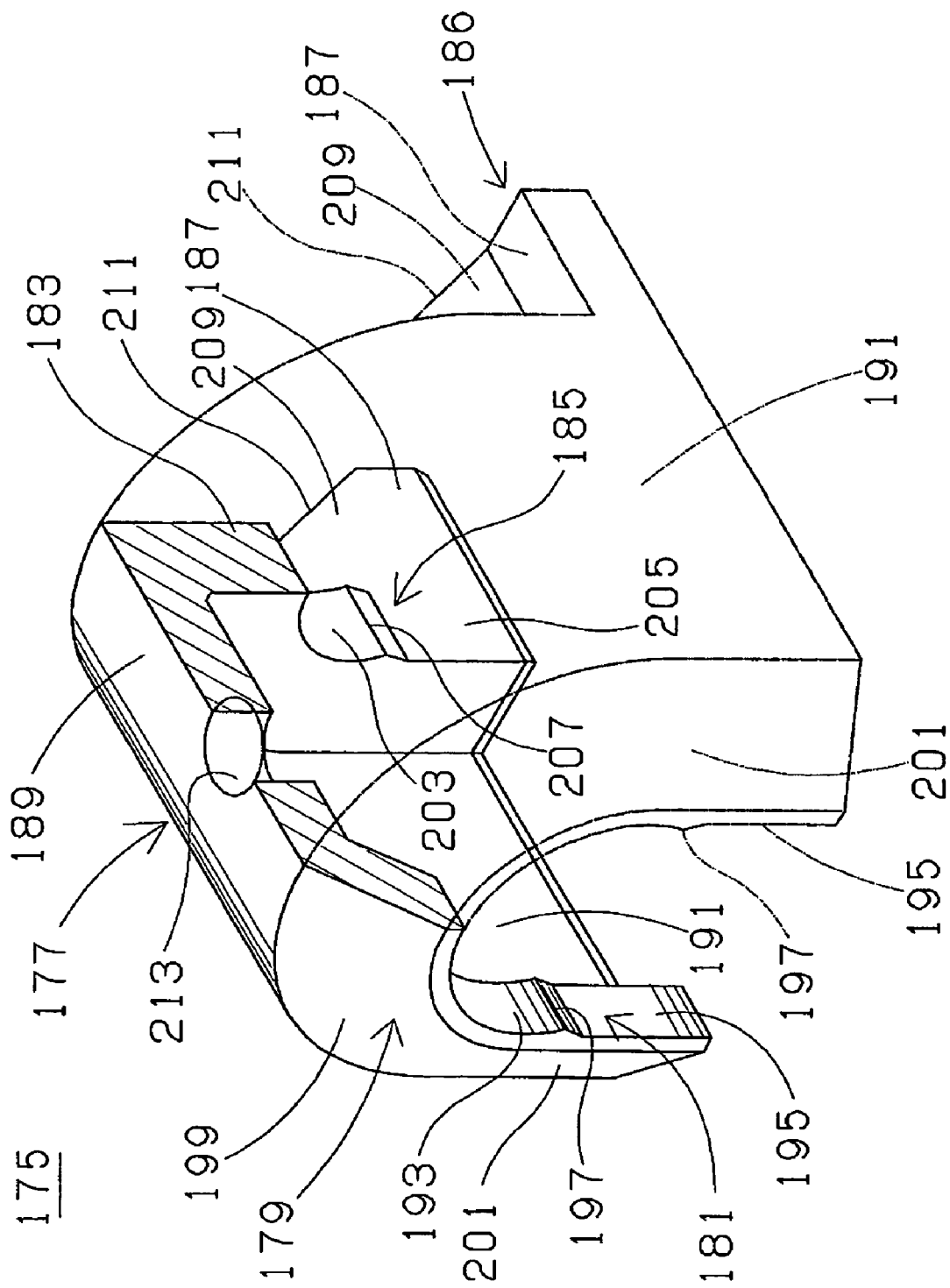
FIG. 15 is a perspective sectional view of the another connector clip for verifying complete connection between a connector and a pipe according to the present invention.
Figure 16:
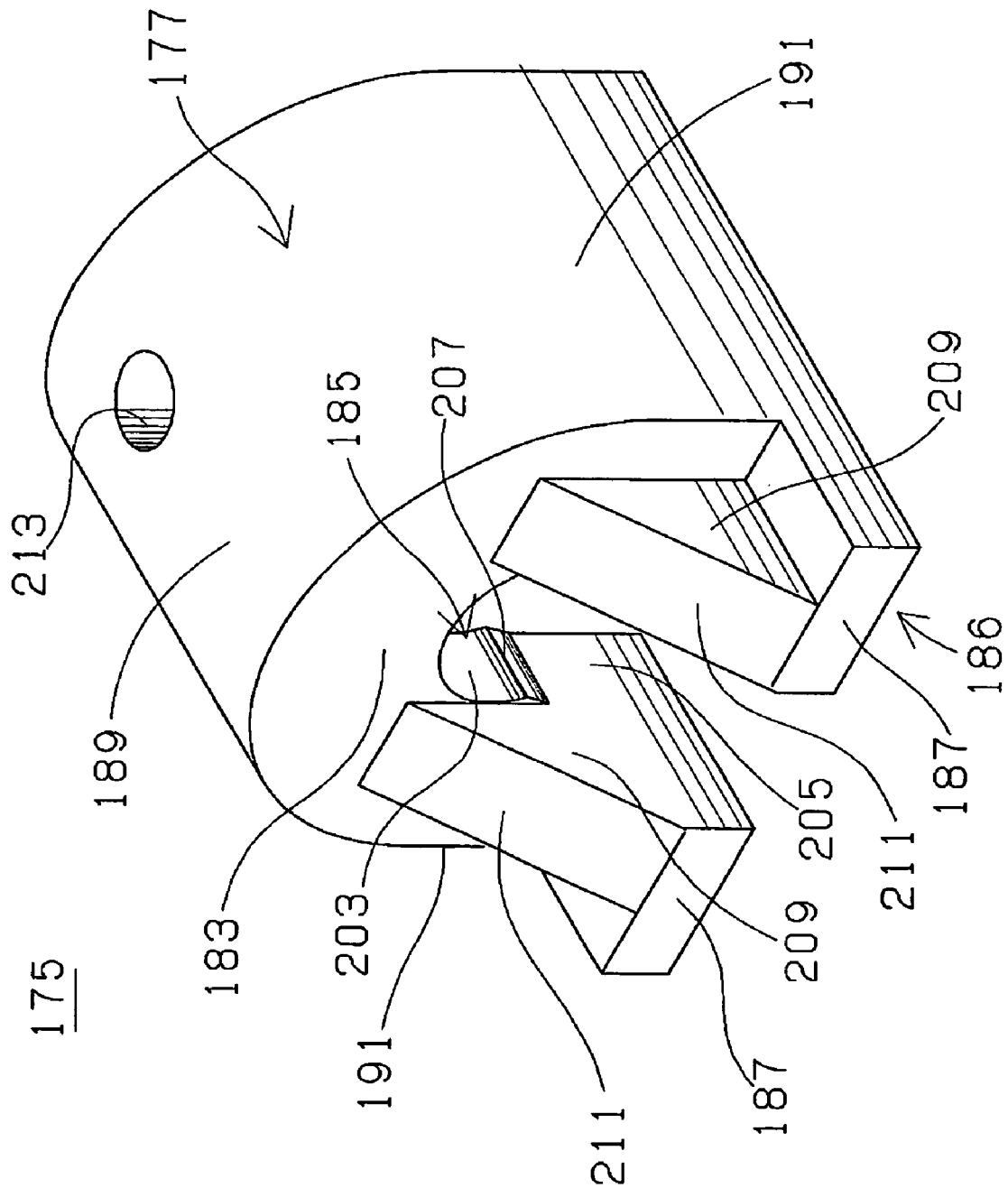
FIG. 16 is a perspective view of the another connector clip for verifying complete connection between a connector and a pipe according to the present invention seen from different direction.
Figure 17:
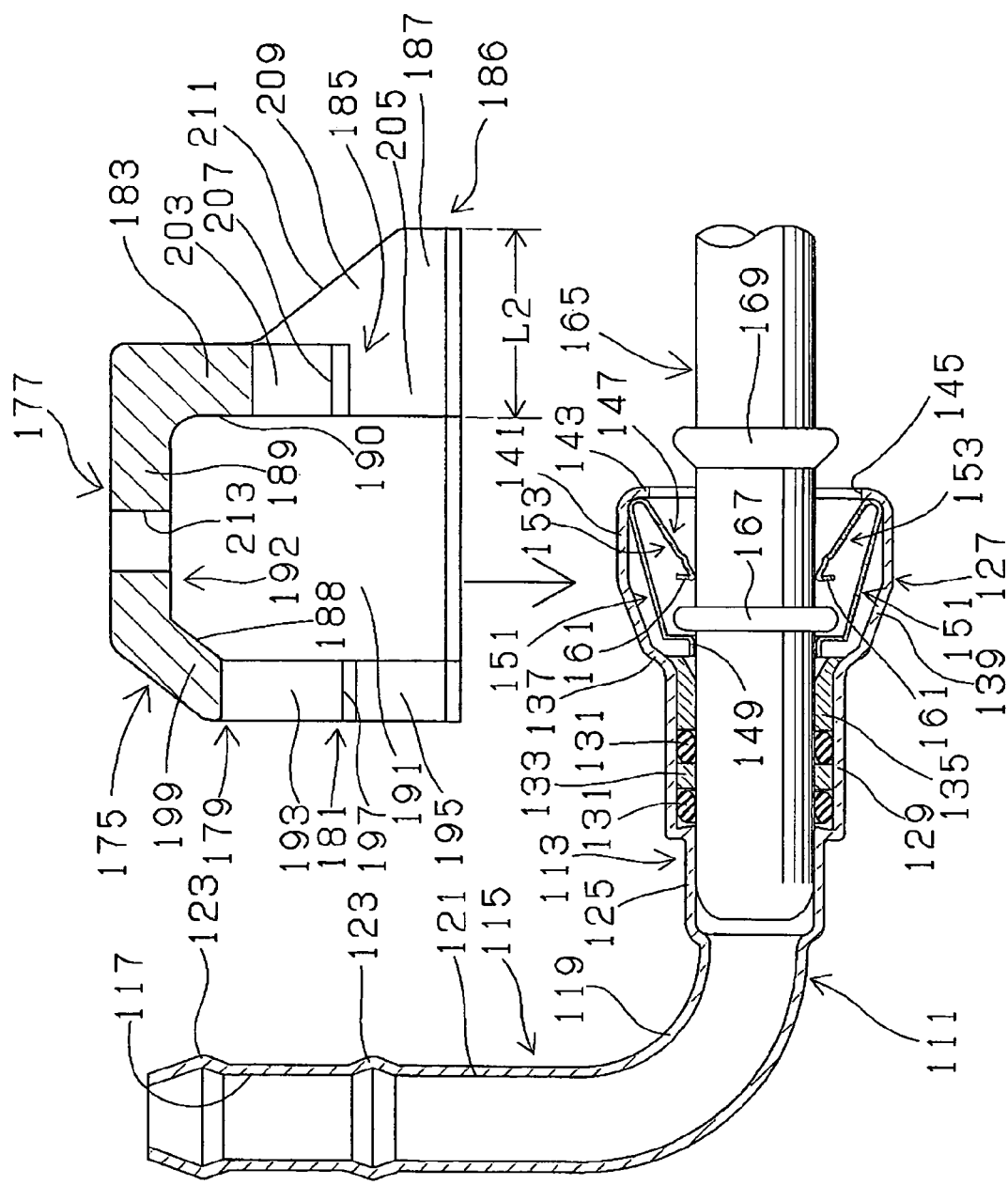
FIG. 17 is an explanatory view showing the case that the another connector clip for verifying complete connection between a connector and a pipe according to the present invention is to be mounted to the another connector and the another pipe.
Figure 18:
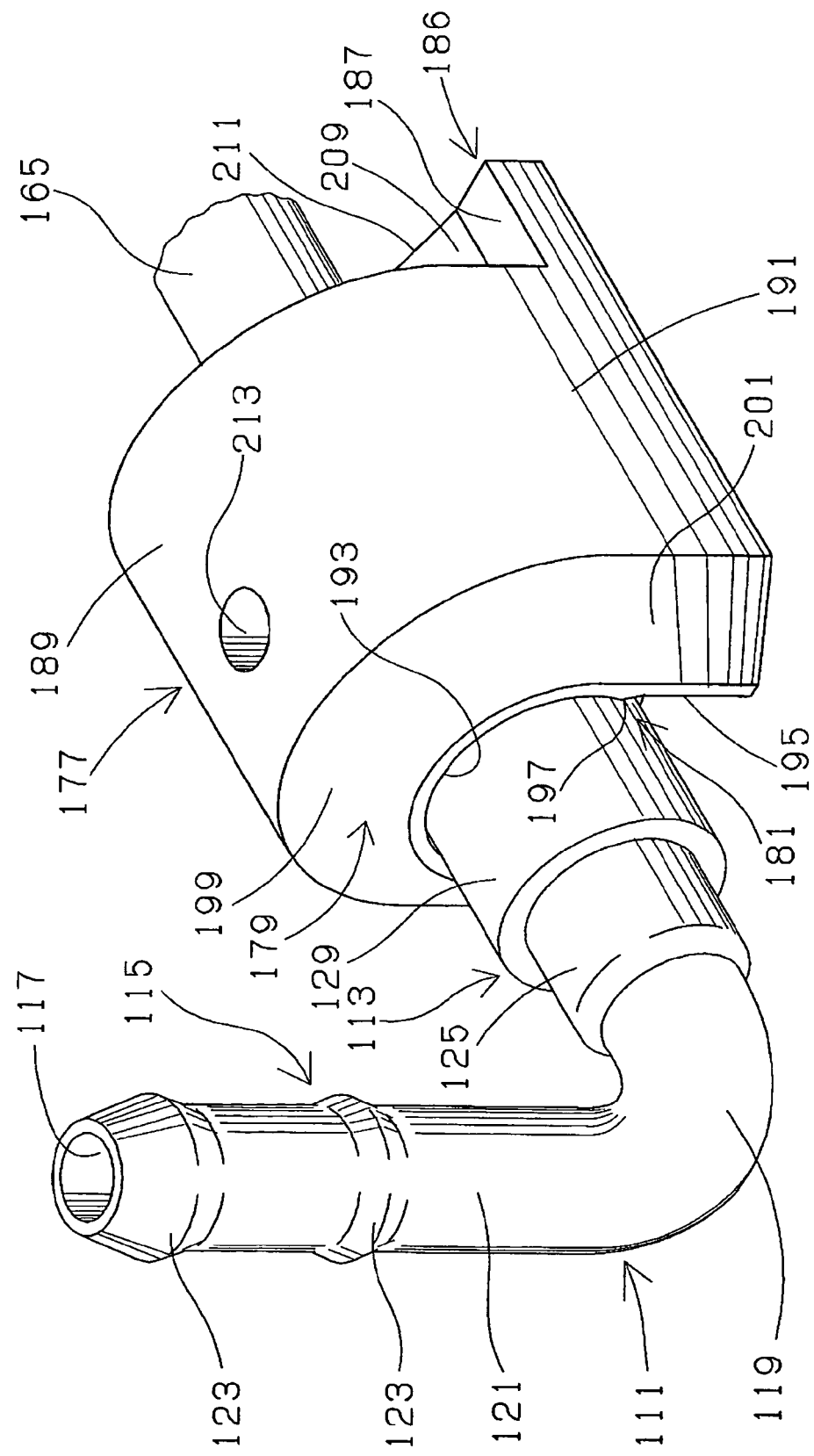
FIG. 18 is a perspective view showing the case that the another connector clip for verifying complete connection between a connector and a pipe according to the present invention is mounted to the another connector and the another pipe.
Figure 19:
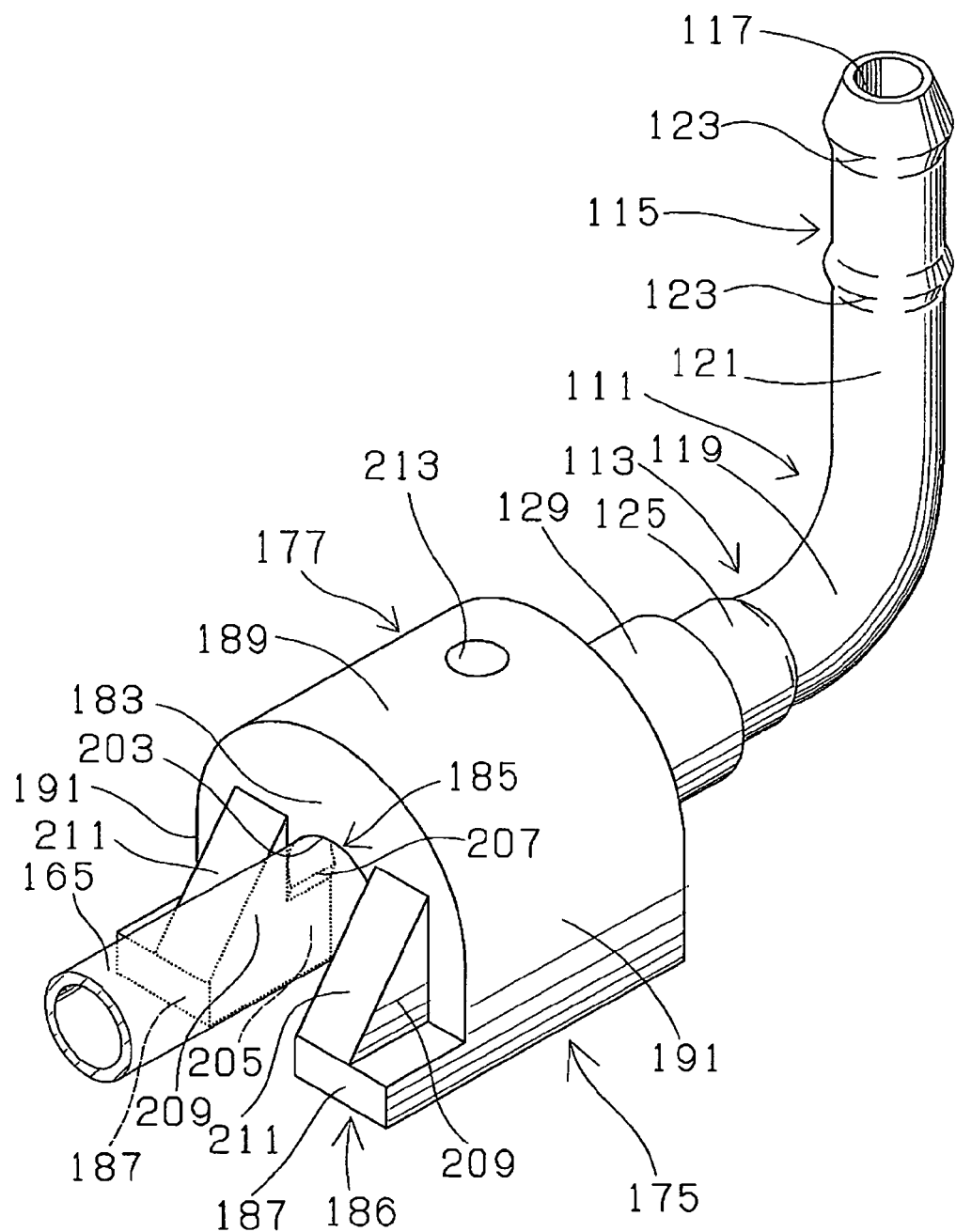
FIG. 19 is a perspective view showing the case that the another connector clip for verifying complete connection between a connector and a pipe according to the present invention is mounted to the another connector and the another pipe, seen from a different direction.
Figure 20:
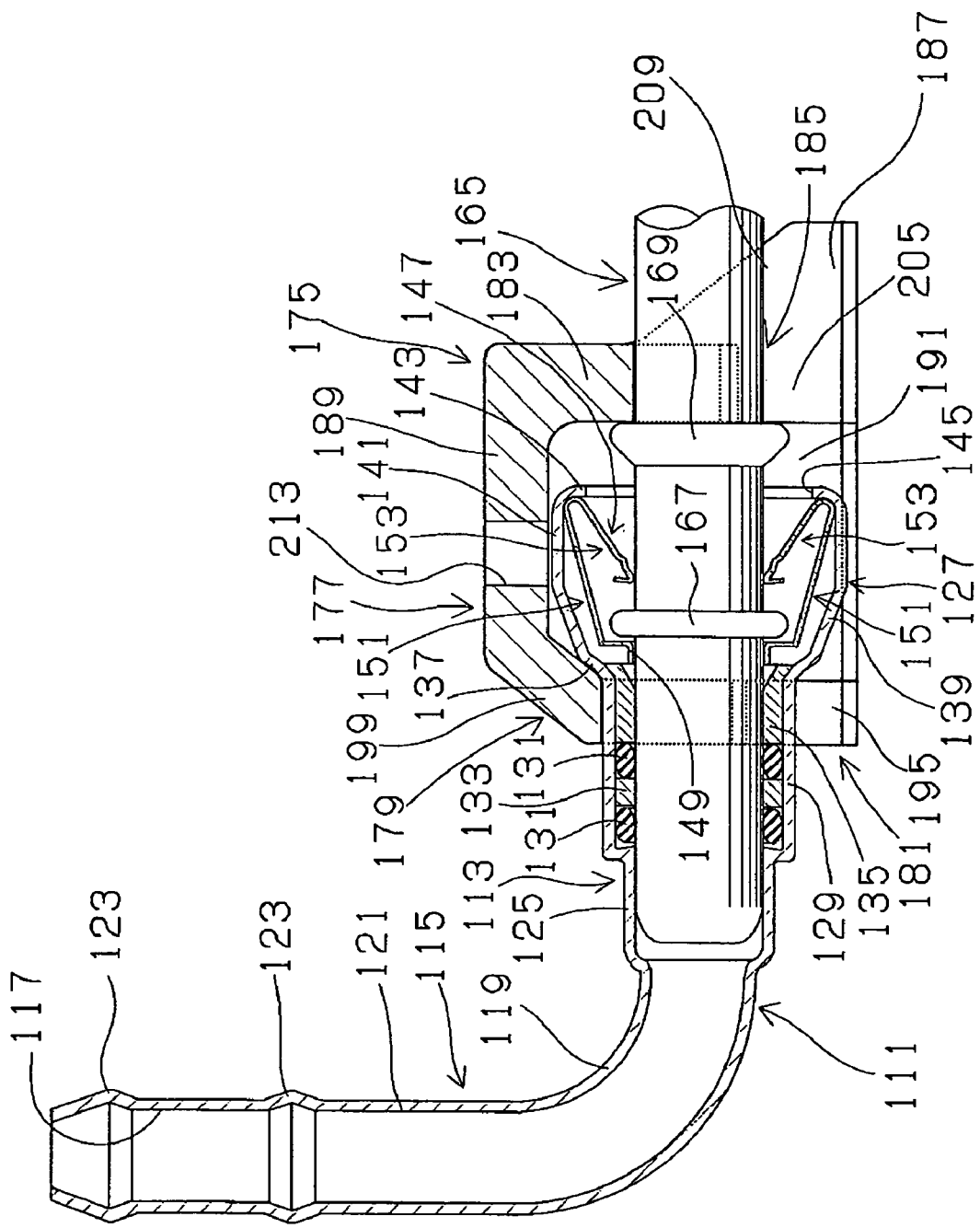
FIG. 20 is a sectional view showing the case that the another connector clip for verifying complete connection between a connector and a pipe according to the present invention is mounted to the another connector and the another pipe.

For another connector clip or cap 175 for verifying complete connection between a connector and a pipe, shown in FIGS. 15 and 16, to be put on and mounted to the connector 111 and the pipe 165, thermoplastic resin is widely used as material. If heat resistant property is required, polyamide type resin such as PA11, PA12 and PA66 or nylon is adapted. Polypropylene type resin such as PP or polyester type resin may be adapted to achieve cost reduction.

The connector clip 175 is constructed in a form of U-shape in cross-section so as to be put on and mounted to the connector housing 113 and the pipe 165 via a side of a U-shaped opening or U-shaped open extending longitudinally or axially of the connector housing 113 and the pipe 165. The connector clip 175 comprises a clip body (cap body) 177 of U-shape in cross-section, a one-side wall portion 179 formed integrally on one axial end of the clip body 177 and having a connector fit-on recess 181, and an opposite-side wall portion 183 formed integrally on an opposite axial end of the clip body 177 and having a pipe fit-on recess 185. The connector clip 175 also comprises a connection verifying portion 186 formed integrally on the clip body 177, more specifically, a pair of thin-walled restraining lugs (or pieces) 187 formed integrally on an opposite axial side surface of the opposite-side wall portion 183 at widthwise opposite sides thereof and end portions of U-shaped opening side so as to extend in an opposite axial direction. An axial distance between the one-side wall portion 179, more specifically, an edge or edge portion of the connector fit-on portion 181 of an inner surface 188 (one clip portion) of the one-side wall portion 179 and the opposite-side wall portion 183, more specifically, an inner surface 190 (opposite clip portion) of the opposite-side wall portion 183 is designed generally equal to an axial distance between one axial end of the annular holding portion 127 of the connector 111 and an opposite axial end of the annular verification projection 169 of the pipe 165 which is completely fitted in and connected to the connector 111. And, an axial distance between an inner surface 190 of the opposite-side wall portion 183 and an opposite axial end of the restraining lug 187 is designed slightly longer than an axial length between the annular engagement projection 167 and the annular verification projection 169 of the pipe 165.

The clip body 177 includes an arcuate wall portion 189 of semicircular shape in cross-section, and a pair of flat side wall portions 191 formed integrally on and continuously from the arcuate wall portion 189 at widthwise opposite ends thereof, and the clip body 177 internally defines a receptacle portion or an inner receiving portion 192 of U-shape in cross-section. An inner surface of the arcuate wall portion 189 is designed to have an inner diameter equal to or generally equal to an outer diameter of the opening side portion 141 of the annular holding portion 127, and a distance between a pair of the side wall portions 191 is designed equal to or generally equal to an outer diameter of the opening side portion 141 of the annular holding portion 127.

The connector fit-on recess 181 of the one-side wall portion 179 includes one semicircular fit-on portion 193 formed concentric with an inner surface of the arcuate wall portion 189 of the clip body 177, and one lead-in portion 195 extending from the one semicircular fit-on portion 193 at circumferential or widthwise opposite ends thereof in parallel relation with the side wall portions 191 and opening into space. An inner diameter of the one semicircular fit-on portion 193 and a width of the one lead-in portion 195 are designed equal to or generally equal to an outer diameter of the cylindrical sealing portion 129 of the connector housing 113, and snap ridges 197 are provided around on a border between the one semicircular fit-on portion 193 and the one lead-in portion 195. Thus, the one-side wall portion 179 includes a semicircular portion 199 of which an inner periphery defines the one semicircular fit-on portion 193, and a pair of side portions 201 of which widthwise inner ends define the one lead-in portion 195. Further, the one-side wall portion 179 is designed to protrude the one connector fit-on recess 181 in one axial direction from an outer edge of the one-side wall portion 179 in such manner that the side portions 201 extend radially inwardly and are tapered or inclined in one axial direction respectively, and the semicircular portion 199 protrudes in one axial direction in a frustoconical shape.

The pipe fit-on recess 185 of the opposite-side wall portion 183 includes an opposite semicircular fit-on portion 203 formed concentric with an inner surface of the arcuate wall portion 189 of the clip body 177, and an opposite lead-in portion 205 extending from the opposite semicircular fit-on portion 203 at circumferential or widthwise opposite ends thereof in parallel relation with the side wall portions 191 and opening into space. An inner diameter of the opposite semicircular fit-on portion 203 and a width of the opposite lead-in portion 205 are designed equal to or generally equal to an outer diameter of a body of the pipe 165, and opposite snap ridges 207 are provided around on a border between the opposite semicircular fit-on portion 203 and the opposite lead-in portion 205.

A pair of the restraining lugs 187 are formed integrally on the opposite-side wall portion 183 or an opposite axial side surface of the opposite-side wall portion 183 so that widthwise inner end surfaces of the restraining lugs 187 correspond to the opposite lead-in portion 205 of the pipe fit-on portion 185 in coplanar relation with one another, and widthwise outer end surfaces of the restraining lugs 187 correspond to outer surfaces of the side wall portions 191 or an outer surface of the opposite-side wall portion 183 of the clip body 177 in coplanar relation. Thus, a distance between a pair of the restraining lugs 187 is designed equal to a width of the pipe fit-on recess 185. And, reinforcement ribs 209 are formed integrally between the restraining lugs 187 and the opposite-side wall portion 183 respectively, so that widthwise inner surfaces thereof correspond to widthwise inner end surfaces of the restraining lugs 187 and the opposite lead-in portion 205 of the pipe fit-on recess 185 in coplanar relation. The reinforcement ribs 209 are relatively thick-walled and unitary with the restraining lugs 187 along entire length thereof The reinforcement ribs 209 extend so as to rise gradually upward in one axial direction from an opposite axial end of an upper surface (a surface on a side of the opposite-side wall portion 183) of the restraining lug 187 up to a height the same or generally the same as the deepest position of the pipe fit-on portion 185 at a joint position with the opposite-side wall portion 183. An end surface 211 of each reinforcement rib 209 is formed as beveled surface extending from the opposite axial end of the upper surface of the restraining lug 187 up to the opposite-side wall portion 183.

A numeral reference 213, for example, in FIG. 15 indicates a drain hole formed in the arcuate wall portion 189. The drain hole 213 is intended to discharge therethrough an internal fluid which leaks out of a connection part between the connector 111 and the pipe 165.

As shown in FIGS. 17 to 20, the another connector clip 175 is mounted to the connector 111 and the pipe 165 so that; a portion of the cylindrical sealing portion 129, adjacent to the annular holding portion 127, is passed or moved through the one lead-in portion 195 of the one-side wall portion 179 and snap-fitted in the one semicircular fit-on portion 193; a held portion from the annular holding portion 127 to the annular verification projection 169 of the pipe 165 is received in the clip body 177 or the receptacle portion 192, while held by the one-side wall portion 179 and the opposite-side wall portion 183, more specifically between a portion around edge of the connector fit-on portion 181 in the inner surface 188 of the one-side wall portion 179 and an inner surface 190 of the opposite-side wall portion 183 from opposite axial sides; the opposite axial side of (from or beyond) the annular verification projection 169 with respect to the pipe 165 is passed and moved through the opposite lead-in portion 205 of the opposite-side wall portion 183 and snap-fitted in the opposite semicircular fit-on portion 203, and an opposite axial side further beyond the annular verification projection 169 with respect to the pipe 165 is passed between a pair of the restraining lugs 187. As the held portion between the annular holding portion 127 and the annular verification projection 169 of the pipe 165 is held or clipped from opposite axial sides by the one-side wall portion 179 and the opposite-side wall portion 183, and the pipe 165 is certainly prevented from escaping the connector 111.

Figure 21:
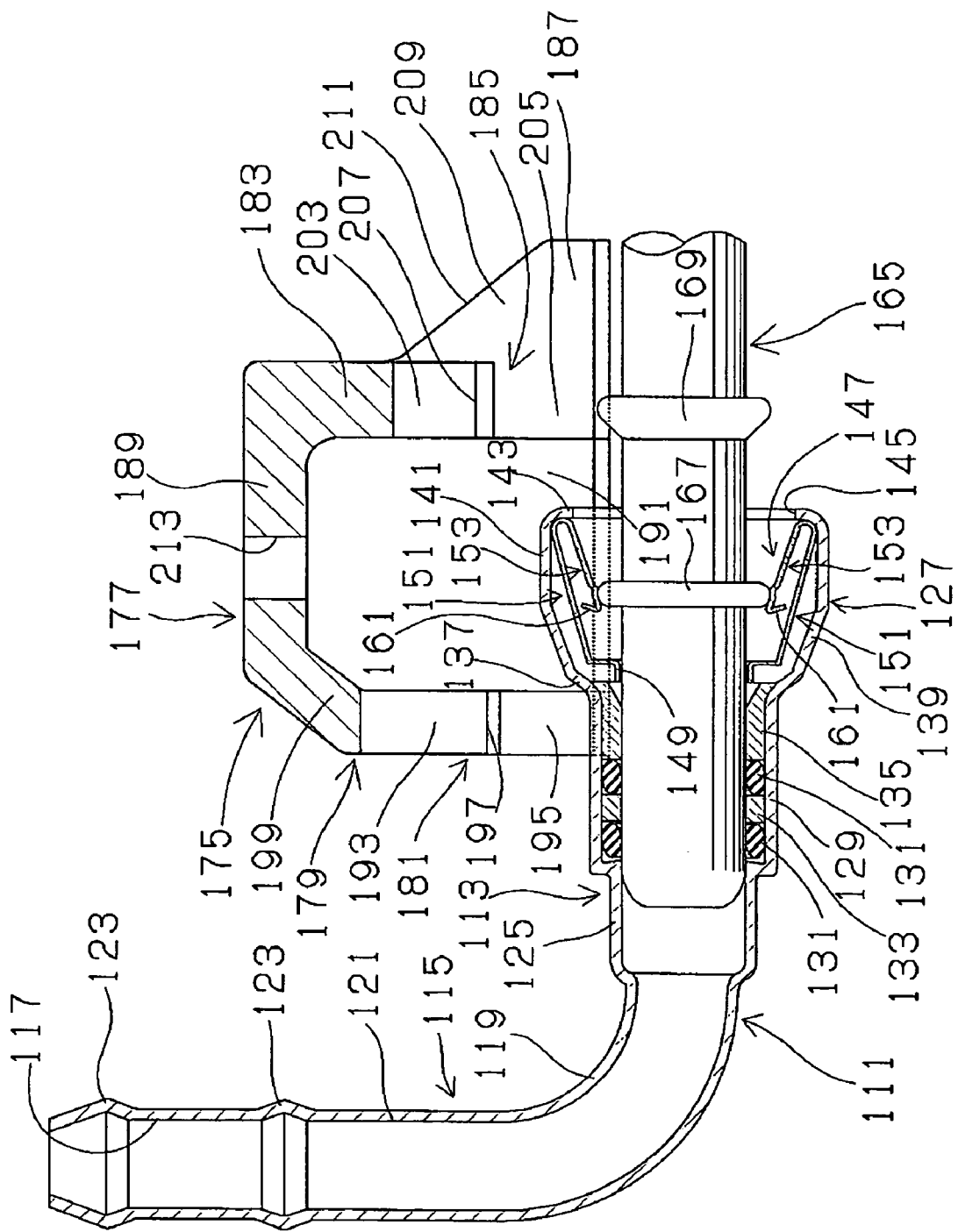
FIG. 21 is an explanatory view showing the case that the another connector clip for verifying complete connection between a connector and a pipe according to the present invention is tried to be mounted to the another connector and the another pipe, when the another pipe is incompletely connected to the another connector.

As shown in FIG. 21, if the pipe 165 is not sufficiently inserted in the connector 111 or the retainer 147 and the annular engagement projection 167 of the pipe 165 does not engage with the abutment portion 161 of the engagement portion 153 of the retainer 147, the annular verification projection 169 of the pipe 165 is located further apart toward an opposite axial direction from an opposite axial end of the connector housing 113, compared to the case that the pipe 165 is correctly connected to the connector 111. Therefore, when the connector clip 175 is tried to be mounted to the connector 111 and the pipe 165 so that the annular holding portion 127 is received in the clip body 177, the annular verification projection 169 of the pipe 165 is not located so as to seat in the clip body 177 but on a side of the restraining lug 187. However, as a distance between the restraining lugs 187 is designed smaller than an outer diameter of the annular verification projection 169 of the pipe 165, the annular verification projection 169 contacts with or abuts the restraining lugs 187 and the pipe 165 cannot pass between the restraining lugs 187. Therefore, the connector clip 175 cannot be mounted to the connector 111 and the pipe 165 (in FIG. 21, the annular verification projection 169 abuts the opposite-side wall portion 183). Here, as a pair of the restraining lugs or tabs 187 are formed less deformable by providing with reinforcement ribs 209, the annular verification projection 169 does not pass between a pair of the restraining lugs 187 even if the annular verification projection 169 is strongly pushed against the restraining lugs 187.

Figure 22:
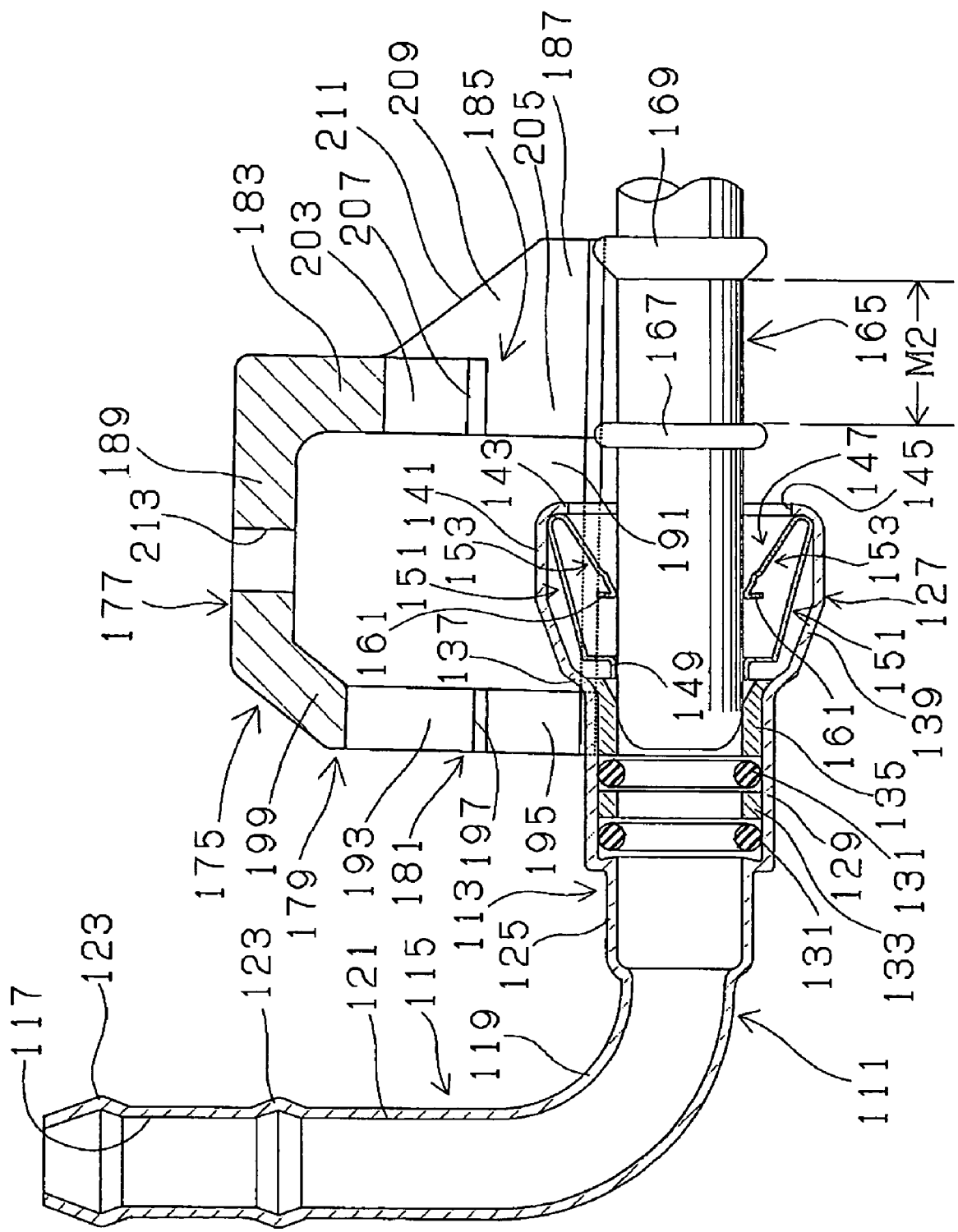
FIG. 22 is an explanatory view showing the case that the another connector clip for verifying complete connection between a connector and a pipe according to the present invention is tried to be mounted to the another connector and the another pipe, when the another pipe is incompletely connected to the another connector in a different manner

And, if the pipe 165 is not sufficiently inserted in the connector 111 or the retainer 147, the annular verification projection 169 of the pipe 165 is located far apart from an opposite axial end of the connector housing 113 toward an opposite axial direction, and the annular verification projection 169 of the pipe 165 is to be located on an opposite axial side of (from or beyond) the restraining lugs 187, as an axial distance (L2 in FIG. 17) between an inner surface 190 of the opposite-side wall portion 183 and an opposite axial end of the restraining lug 187 is designed longer than an axial length (M2 in FIG. 22) of the pipe 165 between the annular engagement projection 167 and the annular verification projection 169, as shown in FIG. 22, the annular engagement projection 167 of the pipe 165 is to be located on a side of the restraining lugs 187. Therefore, when the connector clip 175 is tried to be mounted to the connector 111 and the pipe 165, the annular engagement projection 167 of the pipe 165 abuts a pair of the restraining lugs 187 which are arranged with a space narrower than an outer diameter of the annular engagement projection 167 of the pipe 165, or ends of U-shaped opening side of the opposite-side wall portion 183 which has the pipe fit-on recess 185 with width narrower than an outer diameter of the annular engagement projection 167 of the pipe 165, and thereby the another connector clip 175 cannot be mounted to the connector 111 and the pipe 165 (FIG. 22 shows the case that the annular verification projection 169 abuts the restraining lugs 187, and the annular engagement projection 167 abuts ends of U-shaped opening side of the opposite-side wall portion 183).

Figure 23:
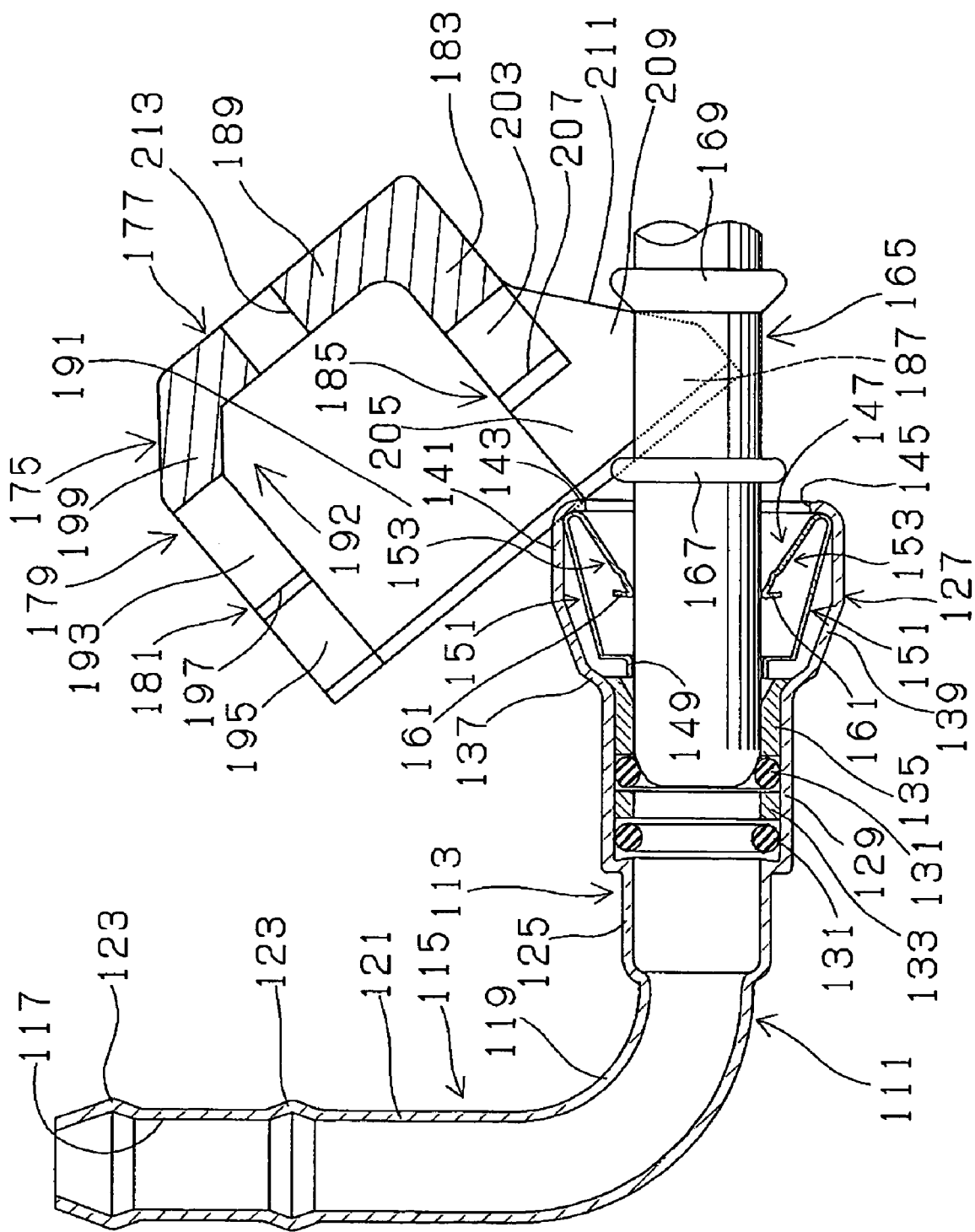
FIG. 23 is an explanatory view showing the case that the another connector clip for verifying complete connection between a connector and a pipe according to the present invention is tried to be mounted to the another connector and the another pipe in a peculiar manner, when the another pipe is incompletely connected to the another connector.
Figure 24:
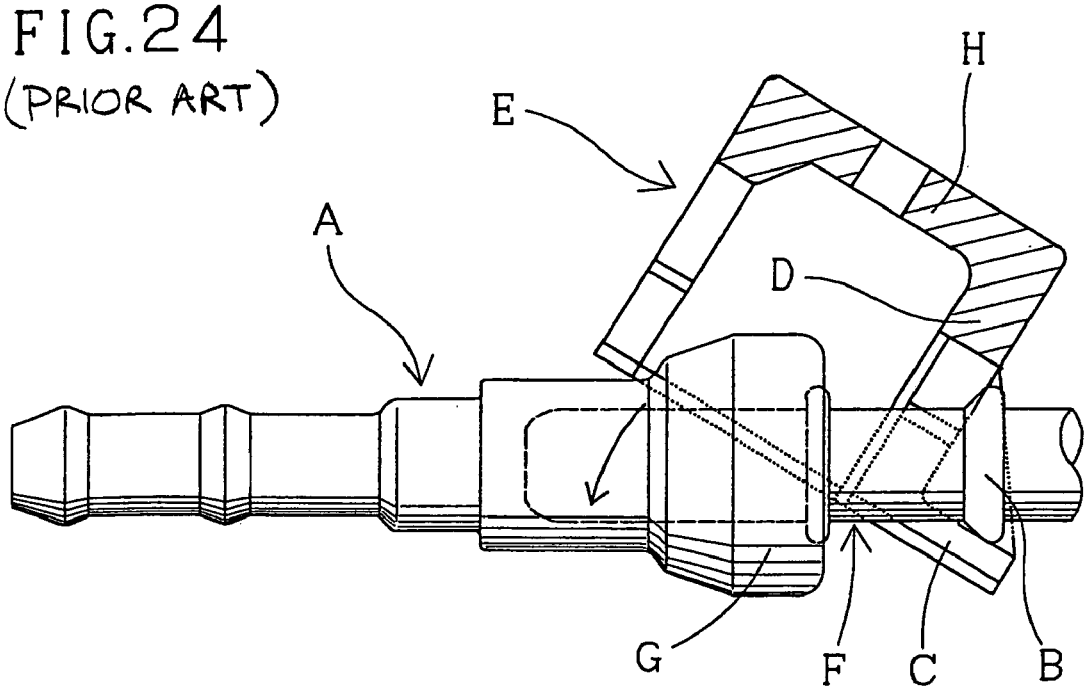
FIG. 24 is an explanatory view showing the case that a conventional connector clip for verifying complete connection between a connector and a pipe is tried to be mounted to a connector and a pipe in a peculiar manner, when the pipe is incompletely connected to the connector.
Figure 25:
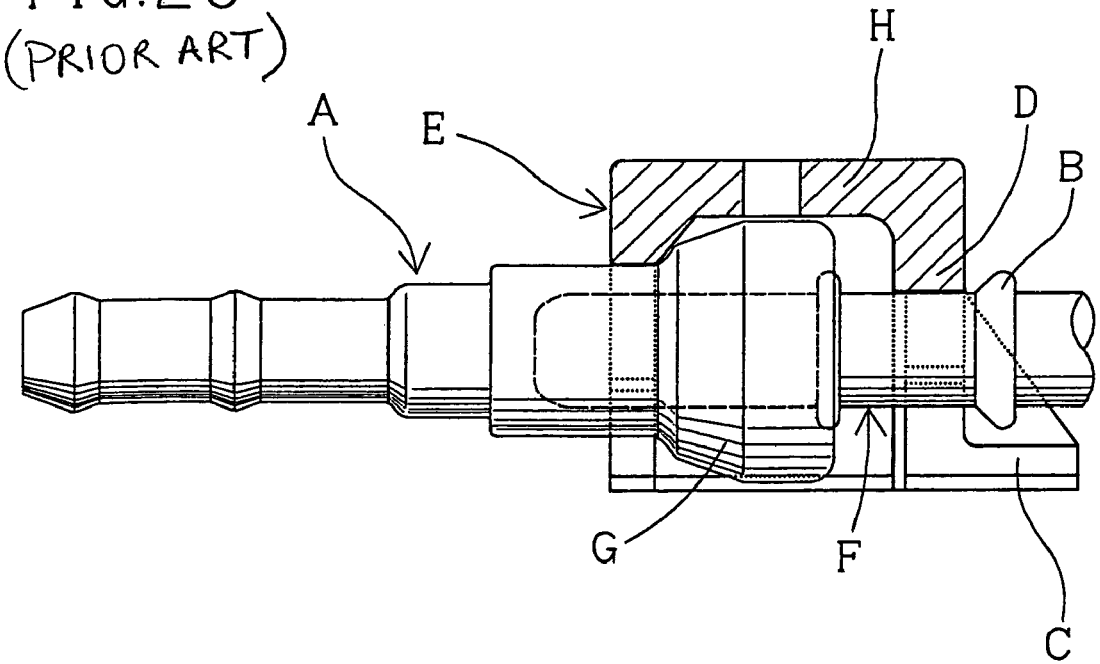
FIG. 25 is a sectional view showing the case that the conventional connector clip for verifying complete connection between a connector and a pipe is mounted to the connector and the pipe in a peculiar manner.

Further, as shown in FIG. 23, when the pipe 165 is not sufficiently inserted in the connector 111 or the retainer 147 and the annular engagement projection 167 of the pipe 165 does not engage with the abutment portion 161 of the engagement portion 153 of the retainer 147, if one axial side of (from or beyond) the annular verification projection 169 with respect to the pipe 165 is moved between the restraining lugs 187 or fitted therebetween via opposite axial side of the restraining lugs 187, the annular verification projection 169 is prevented from entirely entering between the restraining lugs 187 and the opposite-side wall portion 185 due to abutment of the annular verification projection 169 against the end surfaces 211 of the reinforcement ribs 209. Consequently, as the annular engagement projection 167 abuts the ends of U-shaped opening side of the other-side wall portion 185, the pipe 165 cannot pass between the restraining lugs 187. Therefore, the another connector clip 175 cannot be mounted to the connector 111 and the pipe 165.

We claim:

1. A connector clip for verifying complete connection between a connector and a pipe to be put thereon and mounted thereto; the connector having a tube connecting portion on one axial side thereof and retainer means on an opposite axial side thereof, and being provided with sealing member in an inner peripheral surface thereof the pipe being provided with an annular engagement projection and an annular verification projection on an outer peripheral surface thereof, and being inserted into an opening on an axial end of the connector so as to allow an inserting end thereof to be located beyond the sealing member and the annular engagement projection to be snap-engaged with the retainer means;

and the annular verification projection being formed so as to be located in or near an opposite axial end of the connector, or on an opposite axial side of an opposite axial end of the connector; the connector clip comprising:

a clip body on one axial side including one clip portion and an opposite clip portion on one and opposite axial end portions or positions thereof respectively, the clip body being configured to receive a portion of the connector and pipe extending from a large diameter portion on an opposite axial side of the connector to the annular verification projection of the pipe so as to be held by the clip portions at axially opposite ends;

a connection verifying portion on an opposite axial side, continued from the clip body, the connection verifying portion being configured by a pair of restraining portions extending from the clip body in an opposite axial direction with a widthwise distance so as to allow a body of the pipe to pass through or move therebetween but not to allow the annular engagement projection and the annular verification projection of the pipe to pass through therebetween, and an axial distance between the opposite clip portion of the clip body and an opposite axial end of the connection verifying portion being designed shorter than an axial length between the annular engagement projection and the annular verification projection of the pipe, and being designed equal to or longer than an axial distance between the inserting end of the pipe and an opposite axial end of the sealing member.

2. The connector clip for verifying complete connection between a connector and a pipe as set forth in claim 1 wherein the clip body has an inner receiving portion of U-shape in cross-section.

3. The connector clip for verifying complete connection between a connector and a pipe as set forth in claim 2 wherein the inner receiving portion of the clip body has a connector receptacle portion to embrace and receive the large diameter portion of the connector from both axial ends thereof between the one clip portion and a pair of inwardly raised portions which are formed on inner surfaces at opposite axial end portions thereof so as to be raised inwardly respectively.

4. The connector clip for verifying complete connection between a connector and a pipe as set forth in claim 1 wherein the connection verifying portion includes a joint portion to join the pair of the restraining portions, and has a receiving recess of U-shape in cross-section to receive an opposite axial side of the annular verification projection of the pipe.

5. A connector connecting structure for verifying complete connection between a connector and a pipe by way of a connector clip putting thereon and mounting thereto; the connector having a tube connecting portion on one axial side thereof and retainer means on an opposite axial side thereof, and being provided with sealing member in an inner peripheral surface thereof; the pipe being provided with an annular engagement projection and an annular verification projection on an outer peripheral surface thereof, and being inserted into an opening on an axial end of the connector so as to allow an inserting end thereof to be located beyond the sealing member and the annular engagement projection to be snap-engaged with the retainer means; and the annular verification projection being located in or near an opposite axial end of the connector, or on an opposite axial side of an opposite axial end of the connector;

the connector clip, comprising;

a clip body on one axial side including one clip portion and an opposite clip portion on one and opposite axial end portions or positions thereof respectively, the clip body receiving a portion of the connector and pipe extending from a large diameter portion on an opposite axial side of the connector to the annular verification projection of the pipe so as to be held by the clip portions from axially opposite ends, a connection verifying portion on an opposite axial side, continued from the clip body, the connection verifying portion being configured by a pair of restraining portions extending from the clip body in an opposite axial direction with a widthwise distance so as to allow a body of the pipe to pass through or move therebetween but not to allow the annular engagement projection and the annular verification projection of the pipe to pass through therebetween, and an axial distance between the opposite clip portion of the clip body and an opposite axial end of the connection verifying portion being designed shorter than an axial length between the annular engagement projection and the annular verification projection of the pipe, and being designed equal to or longer than an axial distance between the inserting end of the pipe and an opposite axial end of the sealing member.

6. A connector clip for verifying complete connection between a connector and a pipe to be put thereon and mounted thereto; the connector having a tube connecting portion on one axial side thereof and retainer means on an opposite axial side thereof, and being provided with sealing member in an inner peripheral surface thereof the pipe being provided with an annular engagement projection and an annular verification projection on an outer peripheral surface thereof, and being inserted into an opening on an axial end of the connector so as to allow an inserting end thereof to be located beyond the sealing member and the annular engagement projection to be snap-engaged with the retainer means; and the annular verification projection being formed so as to be located in or near an opposite axial end of the connector, or on an opposite axial side of an opposite axial end of the connector; the connector clip comprising:

a clip body on one axial side including one clip portion and an opposite clip portion on one and opposite axial end portions or positions thereof respectively and having an inner receiving portion of U-shape in cross-section, the clip body being configured to receive a portion of the connector and pipe extending from a large diameter portion on an opposite axial side of the connector to the annular verification projection of the pipe so as to be held by the clip portions from axially opposite ends, a connection verifying portion on an opposite axial side, continued from the clip body, the connection verifying portion being configured by a pair of restraining portions extending from the clip body in an opposite axial direction with a widthwise distance so as to allow a body of the pipe to pass through or move therebetween but not to allow the annular engagement projection and the annular verification projection of the pipe to pass through therebetween, the one clip portion of the clip body being defined in an inside surface of a one-side wall portion having a connector fit-on recess of U-shape, and the opposite clip portion of the clip body being defined in an inside surface of an opposite-side wall portion having a pipe fit-on recess of U-shape with a width equal to or generally equal to an outer diameter of the body of the pipe, said pair of the restraining portions being formed in a form of a pair of restraining tugs which are provided integrally on end portions of an opening side of the opposite-side wall portion with the pipe fit-on recess therebetween and extend in an opposite axial direction, and reinforcement ribs being provided integrally between the restraining lugs and the opposite-side wall portions respectively, an axial distance between the opposite clip portion and opposite axial ends of the restraining lugs being designed longer than an axial length between the annular engagement projection and the annular verification projection of the pipe, and a distance between a pair of the reinforcement ribs is designed shorter than an outer diameter of the annular verification projection of the pipe.

7. The connector clip for verifying complete connection between a connector and a pipe as set forth in claim 6 wherein the one-side wall portion of the clip body is raised in one axial direction so that the connector fit-on recess protrudes in one axial direction.

8. The connector clip for verifying complete connection between a connector and a pipe as set forth in claim 6 wherein the reinforcement ribs are formed for entire length of the restraining lugs respectively.

9. The connector clip for verifying complete connection between a connector and a pipe as set forth in claim 6 wherein the reinforcement ribs extend so as to rise gradually upward in one axial direction thereof.

10. The connector clip for verifying complete connection between a connector and a pipe as set forth in claim 6 wherein the reinforcement ribs are formed along the pipe fit-on recess respectively, and a distance between a pair of the reinforcement ribs is designed equal to or generally equal to a width of the pipe fit-on recess.

11. The connector clip for verifying complete connection between a connector and a pipe as set forth in claim 6 wherein the reinforcement ribs are formed along the pipe fit-on recess respectively, and widthwise inner surfaces thereof correspond to widthwise inner end surfaces of the restraining lugs in coplanar relation respectively.

12. The connector clip for verifying complete connection between a connector and a pipe as set forth in claim 6 wherein widthwise inner surfaces of the reinforcement ribs correspond to widthwise inner end surfaces of the restraining lugs and a lead-in portion of the pipe fit-on recess on an opening side in coplanar relation respectively.

* * * * *